United States Patent
Izumikawa

(10) Patent No.: US 12,497,752 B2
(45) Date of Patent: Dec. 16, 2025

(54) EXCAVATOR AND WORK SYSTEM

(71) Applicant: SUMITOMO CONSTRUCTION MACHINERY CO., LTD., Tokyo (JP)

(72) Inventor: Takeya Izumikawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 550 days.

(21) Appl. No.: 17/448,956

(22) Filed: Sep. 27, 2021

(65) Prior Publication Data
US 2022/0010523 A1 Jan. 13, 2022

Related U.S. Application Data

(63) Continuation of application No. PCT/JP2020/014299, filed on Mar. 27, 2020.

(30) Foreign Application Priority Data

Mar. 28, 2019 (JP) ................................. 2019-065021

(51) Int. Cl.
*E02F 3/43* (2006.01)
*E02F 3/32* (2006.01)
(Continued)

(52) U.S. Cl.
CPC ............. *E02F 3/439* (2013.01); *E02F 9/2025* (2013.01); *E02F 9/2203* (2013.01); *E02F 3/32* (2013.01);
(Continued)

(58) Field of Classification Search
CPC ....... E02F 3/439; E02F 9/2025; E02F 9/2203; E02F 3/32; E02F 9/205; E02F 9/2235;
(Continued)

(56) References Cited

U.S. PATENT DOCUMENTS 7,103,545 B2 9/2006 Furuta
2002/0152079 A1* 10/2002 Furuta ....................... E02F 9/26
704/275

(Continued)

FOREIGN PATENT DOCUMENTS

EP 0717198 6/1996
EP 2765244 8/2014
(Continued)

OTHER PUBLICATIONS

International Search Report for PCT/JP2020/014299 mailed on Jun. 16, 2020.

*Primary Examiner* — Madison R. Inserra
(74) *Attorney, Agent, or Firm* — IPUSA, PLLC

(57) ABSTRACT

A shovel including a lower-part traveling body, an upper-part swiveling body which is enabled to swivel and is mounted to the lower-part traveling body, an actuator, and a control device that implements a first control process that causes the actuator to act autonomously, and a second control process that causes the actuator to act autonomously, wherein the control device is configured to select one control unit from among a plurality of control units that implements the first control process and the second control process, as a priority control process that is given priority to act, in a case where a conflict is judged to occur among the plurality of control units that implements the first control process and the second control process.

8 Claims, 15 Drawing Sheets

(51) Int. Cl.
*E02F 9/20* (2006.01)
*E02F 9/22* (2006.01)

(52) U.S. Cl.
CPC ............ *E02F 9/205* (2013.01); *E02F 9/2235* (2013.01); *E02F 9/2285* (2013.01); *E02F 9/2292* (2013.01); *E02F 9/2296* (2013.01)

(58) Field of Classification Search
CPC ..... E02F 9/2285; E02F 9/2292; E02F 9/2296; E02F 9/2228; E02F 9/2242; E02F 9/2253; E02F 9/2282; E02F 9/262; E02F 9/265; E02F 3/437; E02F 3/43; E02F 9/123; E02F 9/20; E02F 9/22; E02F 9/26
See application file for complete search history.

(56) References Cited

U.S. PATENT DOCUMENTS

| | | | | |
|---|---|---|---|---|
| 2011/0153170 A1* | 6/2011 | Dishman | ............... | E02F 9/2029 |
| | | | | 701/50 |
| 2015/0066346 A1* | 3/2015 | Cheatham, III | ....... | G08G 1/166 |
| | | | | 701/301 |
| 2015/0275471 A1* | 10/2015 | Matsumoto | ............. | E02F 3/432 |
| | | | | 701/50 |
| 2015/0275483 A1* | 10/2015 | Tsukamoto | ........... | E02F 9/2285 |
| | | | | 701/50 |
| 2016/0017571 A1* | 1/2016 | Paull | ..................... | E02F 9/2228 |
| | | | | 701/50 |
| 2017/0191243 A1* | 7/2017 | Sharp | ........................ | E02F 5/06 |
| 2018/0373992 A1* | 12/2018 | Yin | ........................ | G06V 10/25 |
| 2020/0032484 A1* | 1/2020 | O'Donnell | ........... | G05D 1/0088 |
| 2020/0270848 A1* | 8/2020 | Knowles | ................. | E02F 9/265 |
| 2021/0164194 A1* | 6/2021 | Nishi | ...................... | E02F 9/205 |

FOREIGN PATENT DOCUMENTS

| | | | |
|---|---|---|---|
| JP | 2000-160588 | | 6/2000 |
| JP | 2002-049403 | | 2/2002 |
| JP | 2008-240558 | | 10/2008 |
| JP | 2009-293288 | | 12/2009 |
| JP | 2013-217137 | | 10/2013 |
| JP | 2015-194013 | | 11/2015 |
| JP | 2017151815 A | * | 8/2017 |
| WO | WO-2018151280 A1 | * | 8/2018 ............... B60R 1/00 |

* cited by examiner

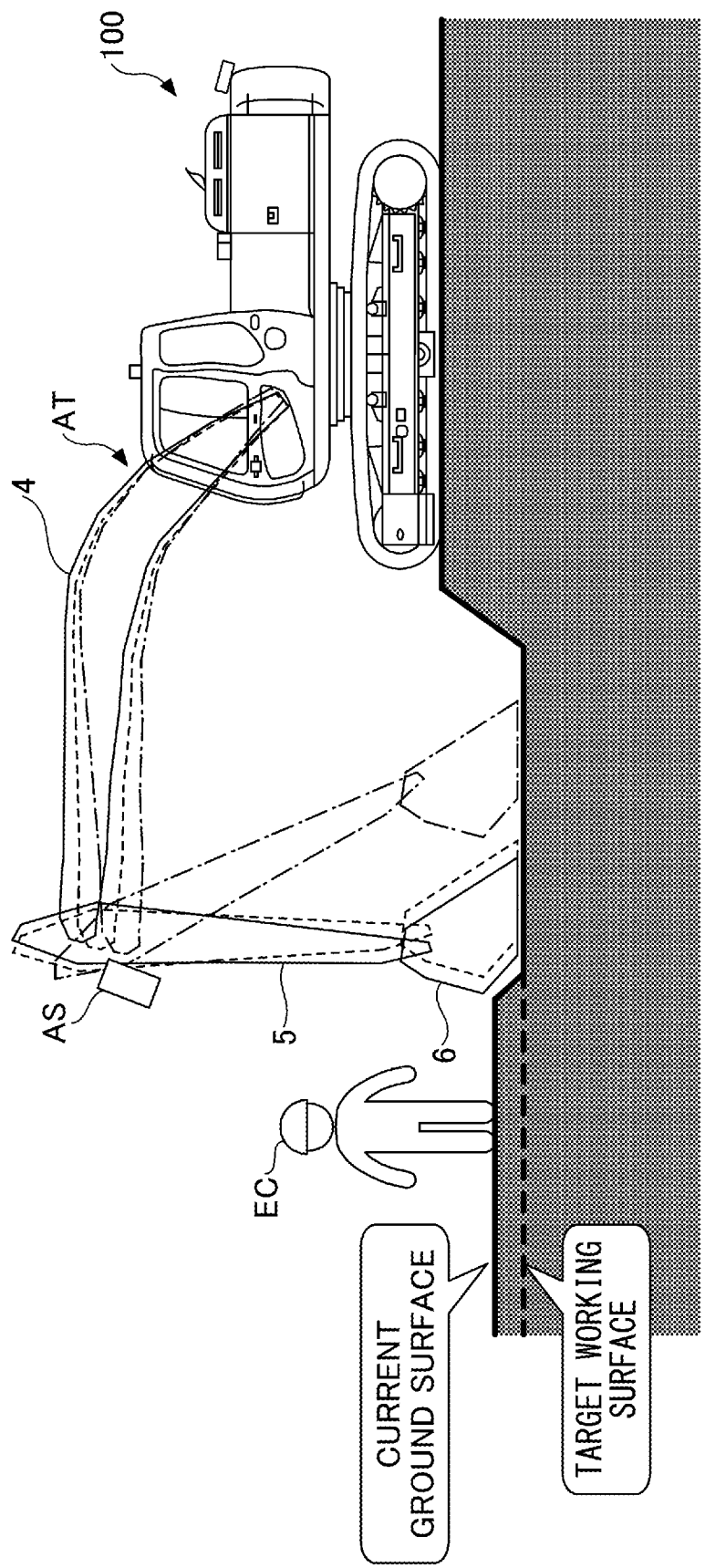

EXCAVATOR AND WORK SYSTEM

RELATED APPLICATION

The present application is a continuation application of International Application No. PCT/JP2020/014299, filed Mar. 27, 2020, which claims priority to Japanese Patent Application No. 2019-065021, filed Mar. 28, 2019. The contents of these applications are incorporated herein by reference in their entirety.

BACKGROUND

Technical Field

This disclosure relates to a shovel as an excavator and work system.

Description of Related Art

Conventionally, a shovel with a function to automatically adjust the position of the tooth edge of a bucket in a process of forming a slope surface is known (see, for example, Patent Document 1).

RELATED ART

Patent Document

[Patent Document 1]
Japanese Laid-Open Patent Application No. 2013-217137

SUMMARY

However, in a case where two functions, namely, a function of automatically adjusting the position of the tooth edge of the bucket and another function of automatically adjusting the position of the tooth edge of the bucket, are simultaneously caused to act, these two functions may conflict each other in a work of forming a slope surface. Then, the above-described shovel may possibly cause the bucket to not act properly.

Therefore, it is desirable to provide a shovel that acts properly even when multiple functions compete.

Means for Solving Problems

A shovel according to an embodiment of the present invention includes a lower-part traveling body, an upper-part swiveling body which is enabled to swivel and is mounted to the lower-part traveling body, an actuator, and a control device that implements a first control process that causes the actuator to act autonomously, and a second control process that causes the actuator to act autonomously, wherein the control device is configured to select one control unit from among a plurality of control units that implements the first control process and the second control process, as a priority control process that is given priority to act, in a case where a conflict is judged to occur among the plurality of control units that implements the first control process and the second control process.

Effect of the Invention

By the above measure, a shovel that acts properly even when multiple functions conflict is provided.

BRIEF DESCRIPTION OF THE DRAWINGS

FIG. 6C is a side view of the shovel performing land leveling work.

DETAILED DESCRIPTION

Figure 1:
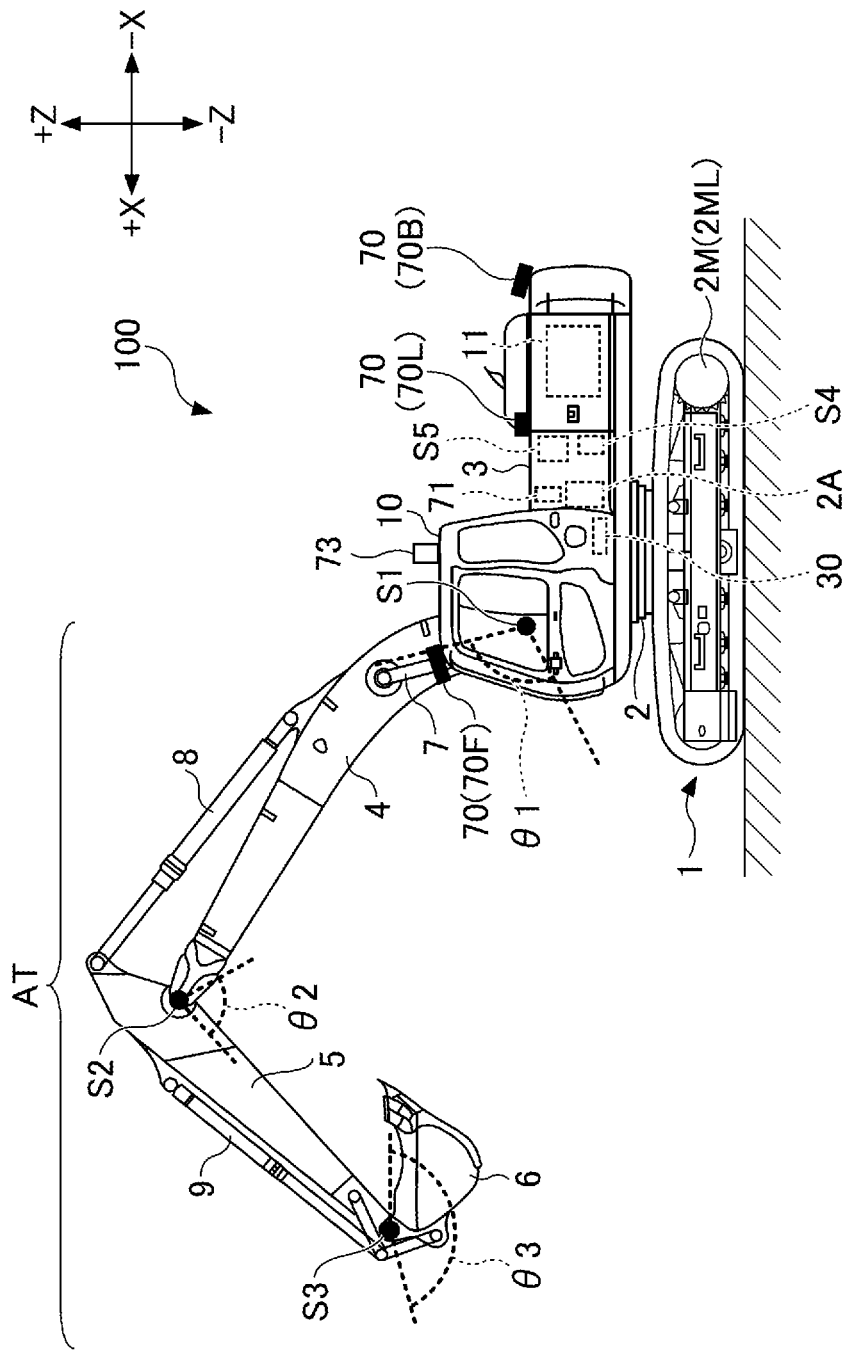
FIG. 1 is a side view of a shovel according to the embodiment of the present invention.
Figure 2:
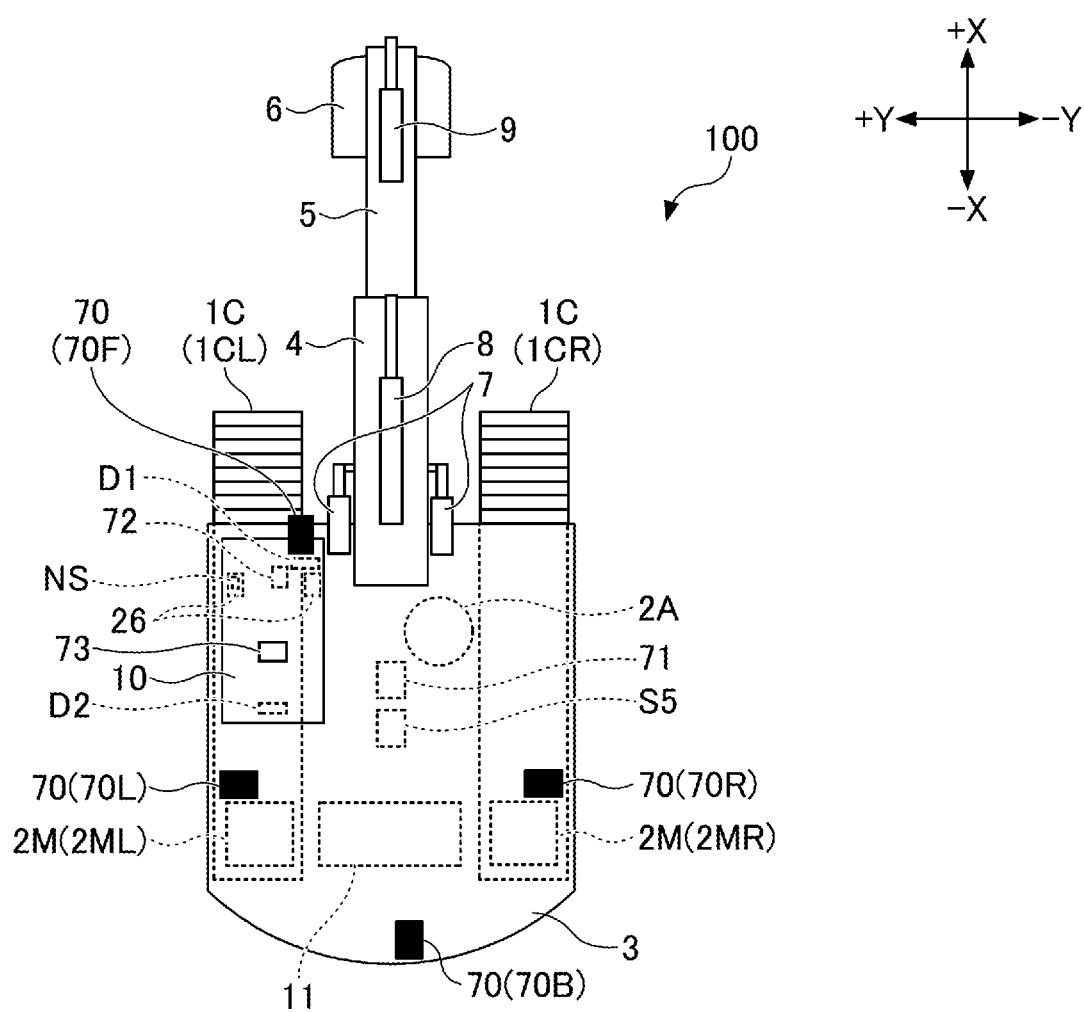
FIG. 2 is a top view of the shovel illustrated in FIG. 1.

First, a shovel 100 as an excavator according to the embodiment of the present invention will be described with reference to FIGS. 1 and 2. FIG. 1 is a side view of the shovel 100, and FIG. 2 is a top view of the shovel 100.

In this embodiment, a lower-part traveling body 1 of the shovel 100 includes a crawler 1C. The crawler 1C is driven by a hydraulic travel motor 2M as a travel actuator mounted to the lower-part traveling body 1. Specifically, the crawler 1C includes a left crawler 1CL and right crawler 1CR. The left crawler 1CL is driven by a left hydraulic travel motor 2ML and the right crawler 1CR is driven by a right hydraulic travel motor 2MR.

An upper-part swiveling body 3 is mounted to the lower-part traveling body 1 via the swivel mechanism 2 so as to be capable of swiveling. The swivel mechanism 2 is driven by a hydraulic swivel motor 2A as a swivel actuator mounted to the upper-part swiveling body 3. However, the swivel actuator may be a swivel motor generator as a motor actuator.

A boom 4 is attached to the upper-part swiveling body 3. An arm 5 is attached to the front edge of the boom 4, and a bucket 6 as an end attachment is attached to the front edge of the arm 5. The boom 4, arm 5, and bucket 6 form an excavation attachment AT, which is an example of an attachment. The boom 4 is driven by a boom cylinder 7, the arm 5 is driven by an arm cylinder 8, and the bucket 6 is driven by a bucket cylinder 9. The boom cylinder 7, the arm cylinder 8, and the bucket cylinder 9 constitute an attachment actuator.

The boom 4 is supported by the upper-part swiveling body 3 so as to be rotatable up and down with respect to the upper-part swiveling body 3. A boom angle sensor S1 is attached to the boom 4. The boom angle sensor S1 can detect the boom angle θ1, which is the rotation angle of the boom 4. The boom angle θ1 is, for example, the angle of rise from the state where the boom 4 is lowered most. Therefore, the boom angle θ1 is maximized when the boom 4 is raised to the great extent possible.

The arm 5 is pivotally supported by the boom 4. An arm angle sensor S2 is attached to the arm 5. The arm angle sensor S2 can detect the arm angle θ2, which is the rotation angle of the arm 5. The arm angle θ2 is, for example, an open angle from the most folded state of the arm 5. Therefore, the arm angle θ2 is maximized when the arm 5 is opened most.

The bucket 6 is rotatably supported relative to the arm 5. A bucket angle sensor S3 is attached to the bucket 6. The bucket angle sensor S3 can detect the bucket angle θ3, which is the rotation angle of the bucket 6. The bucket angle θ3 is the open angle from the most closed state of the bucket 6. Therefore, the bucket angle θ3 is maximized when the arm 5 is stretched to the greatest extent possible.

In the embodiment illustrated in FIG. 1, each of the boom angle sensor S1, the arm angle sensor S2, and the bucket angle sensor S3 are formed by a combination of an acceleration sensor and a gyro sensor. However, each of the boom angle sensor S1, the arm angle sensor S2, and the bucket angle sensor S3 may be formed by only an acceleration sensor. The boom angle sensor S1 may be a stroke sensor attached to the boom cylinder 7, a rotary encoder, a potentiometer, an inertia measuring device, or the like. The same applies to the arm angle sensor S2 and the bucket angle sensor S3.

The upper-part swiveling body 3 is provided with a cabin 10 as a driver's room and a power source such as an engine 11 is mounted therein. A space recognition device 70, an orientation detection device 71, a location measuring device 73, a body inclination sensor S4, and a swiveling angle speed sensor S5 are attached to the upper-part swiveling body 3. Inside the cabin 10, an operation device 26, a controller 30, an information input device 72, a display device D1, a sound output device D2, and the like are provided. For convenience, the side where the excavation attachment AT is mounted in the upper-part swiveling body 3 is called "forward", and the side where a counterweight is mounted is called "backward".

The space recognition device 70 is configured to recognize an object present in the three-dimensional space around the shovel 100. The space recognition device 70 may also be configured to calculate a distance from the space recognition device 70 or the shovel 100 to a recognized object. The space recognition device 70 includes, for example, an ultrasonic sensor, millimeter wave radar, monocular camera, stereo cameras, LIDAR, distance image sensor, infrared sensor, etc., or any combination thereof. In this embodiment, the space recognition device 70 includes a forward sensor 70F mounted at the front edge of the upper surface of the cabin 10, a backward sensor 70B mounted at the rear edge of the upper surface of the upper-part swiveling body 3, a leftward sensor 70L mounted at the left edge of the upper surface of the upper-part swiveling body 3, and a rightward sensor 70R mounted at the right edge of the upper surface of the upper-part swiveling body 3. An upward sensor for recognizing the object present in the space above the upper-part swiveling body 3 may be attached to the shovel 100.

The orientation detection device 71 is configured to detect information regarding the relative relationship between the orientation of the upper-part swiveling body 3 and the orientation of the lower-part traveling body 1. The orientation detection device 71 may include, for example, a combination of a geomagnetic sensor mounted to the lower-part traveling body 1 and another geomagnetic sensor mounted to the upper-part swiveling body 3. Alternatively, the orientation detection device 71 may include a combination of a GNSS receiver mounted to the lower-part traveling body 1 and another GNSS receiver mounted to the upper-part swiveling body 3. The orientation detection device 71 may be a rotary encoder, rotary position sensor, etc., or any combination thereof. In the configuration in which the upper-part swiveling body 3 is driven to swivel by the swivel motor generator, the orientation detection device may be made of a resolver. The orientation detection device 71 may be mounted, for example, to a center joint disposed in relation to the swivel mechanism 2 for implementing a relative rotation between the lower-part traveling body 1 and the upper-part swiveling body 3.

The orientation detection device 71 may be formed by a camera mounted to the upper-part swiveling body 3. In this case, the orientation detection device 71 performs known image processing on the image (the input image) captured by the camera mounted to the upper-part swiveling body 3 and detects the image of the lower-part traveling body 1 included in the input image. The orientation detection device 71 identifies the longitudinal direction of the lower-part traveling body 1 by detecting an image of the lower-part traveling body 1 using a known image recognition technique. Then, an angle formed between the direction of the front and rear axis of the upper-part swiveling body 3 and the longitudinal direction of the lower-part traveling body 1 is obtained. The direction of the front and rear axis of the upper-part swiveling body 3 is obtained from the camera mounting position. In particular, because the crawler 1C protrudes from the upper-part swiveling body 3, the orientation detection device 71 can determine the longitudinal direction of the lower-part traveling body 1 by detecting an image of the crawler 1C. In this case, the orientation detection device 71 may be integrated with the controller 30. The camera may be the space recognition device 70.

The information input device 72 is configured so that an operator of the shovel can input information to the controller 30. In this embodiment, the information input device 72 is a switch panel located adjacent to a display unit of the display device D1. However, the information input device 72 may be a touch panel disposed on the display portion of the display device D1 or a sound input device such as a microphone disposed in the cabin 10. The information input device 72 may be a communication device that acquires information from the outside.

The location measuring device 73 is configured to measure the position of the upper-part swiveling body 3. In this embodiment, the location measuring device 73 is a GNSS receiver that detects the position of the upper-part swiveling body 3 and outputs the detected value to the controller 30. The location measuring device 73 may be a GNSS compass. In this case, the location measuring device 73 also functions as the orientation detection device 71 because the position and orientation of the upper-part swiveling body 3 can be detected.

The body inclination sensor S4 detects the inclination of the upper-part swiveling body 3 relative to a predetermined plane. In this embodiment, the body inclination sensor S4 is an acceleration sensor that detects an inclination angle about the front and rear axis of the upper-part swiveling body 3 with respect to the horizontal plane and an inclination angle about the right and left axes. The front and rear axis and the left and right axis of the upper-part swiveling body 3 pass through a shovel center point that is a point on which the swivel axis of the shovel 100 and are perpendicular with each other, for example.

The swiveling angle speed sensor S5 detects the swiveling angle speed of the upper-part swiveling body 3. In this embodiment, the swiveling angle speed sensor S5 is a gyro sensor. The swiveling angle speed sensor S5 may be a resolver, a rotary encoder, etc., or any combination thereof. The swiveling angle speed sensor S5 may detect the swiveling speed. The swiveling speed may be calculated by referring to the swiveling angle speed.

Hereinafter, at least one of the boom angle sensor S1, the arm angle sensor S2, the bucket angle sensor S3, the body inclination sensor S4, or, the swiveling angle speed sensor S5 is also referred to as an attitude detecting device. The attitude of the excavation attachment AT is detected, for example, based on an output of each of the boom angle sensor S1, the arm angle sensor S2, and the bucket angle sensor S3.

The display device D1 is a device for displaying information. In this embodiment, the display device D1 is a liquid crystal display located within cabin 10. However, the display device D1 may be a display of a portable terminal such as a smartphone.

A sound output device D2 is a device that outputs sound. The sound output device D2 includes at least one from among a device for outputting sound to the operator within cabin 10 and a device for outputting sound to the operator outside cabin 10. It may be a speaker of a portable terminal.

The operation device 26 is a device used by an operator for operating the actuator. The operation device 26 includes, for example, an operation lever and an operation pedal. The actuator includes at least hydraulic actuators or electromotive actuators.

The controller 30 is provided for controlling the shovel 100. In this embodiment, the controller 30 is made of a computer including a CPU, a volatile memory device, a non-volatile memory device, and the like. The controller 30 reads the program corresponding to each function from the non-volatile memory device and loads the program to the volatile memory device, and performs the corresponding processing to the CPU. Each function includes, for example, a machine control function that guides the operator's manual operation of the shovel 100 and a machine control function that supports or causes the operator's manual operation of the shovel 100 to act automatically or autonomously. The controller 30 may include a contact avoidance function that automatically or autonomously acts or stops the shovel 100 to avoid contact with the object present within the monitoring area surrounding the shovel 100. Objects around the shovel 100 are monitored not only within the monitoring range but also outside the monitoring range.

Figure 3:
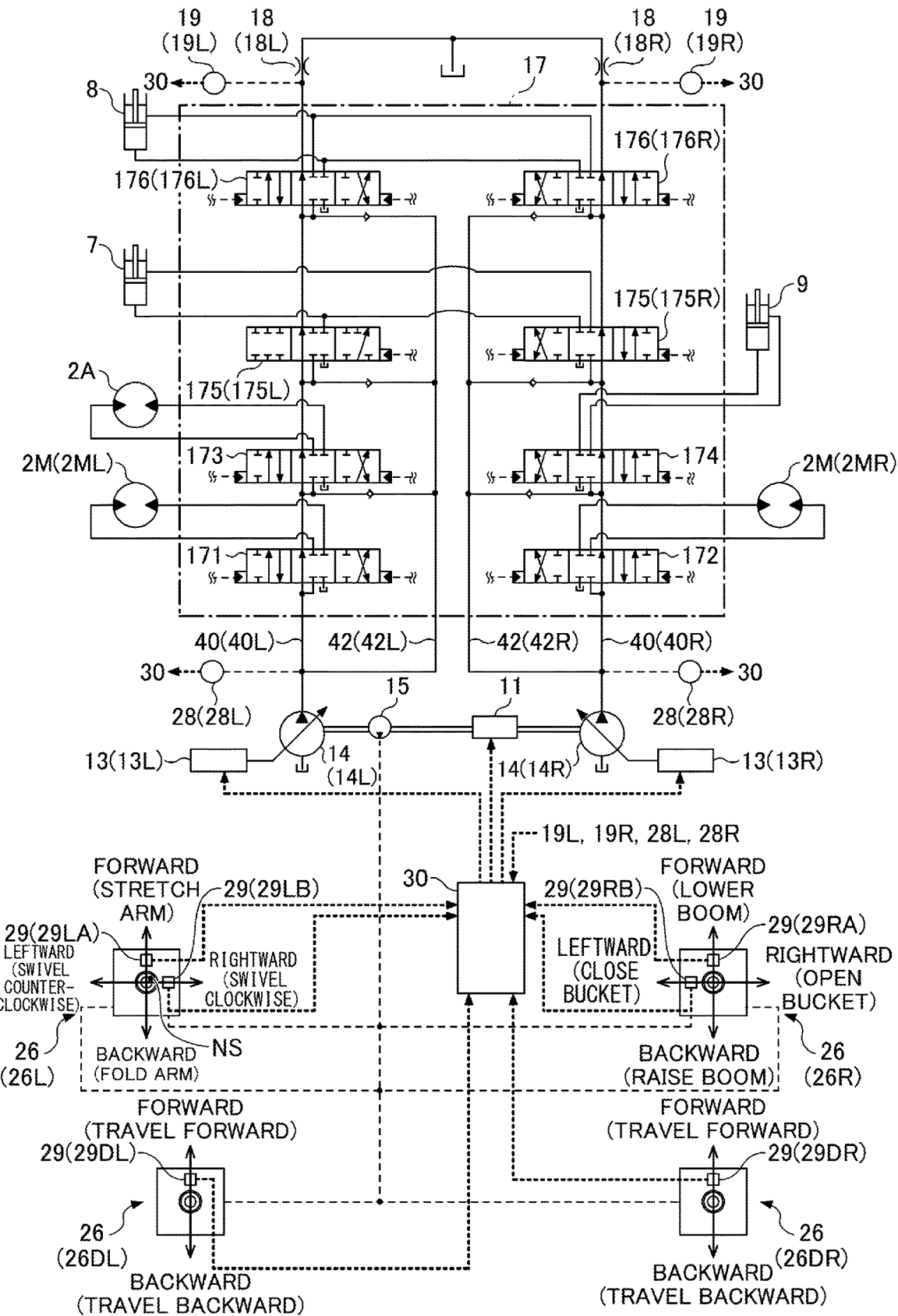
FIG. 3 is a view illustrating an example of the configuration of a hydraulic system mounted to a shovel illustrated in FIG. 1.

Next, an example of a configuration of a hydraulic system installed in the shovel 100 will be described with reference to FIG. 3. FIG. 3 is a diagram illustrating an example of a configuration of the hydraulic system installed in the shovel 100. FIG. 3 illustrates a mechanical power transmission system, the operating oil line, pilot line and electrical control system, respectively, with double, solid, dashed and dotted lines.

The hydraulic system of the shovel 100 mainly includes an engine 11, a regulator 13, a main pump 14, a pilot pumps 15, a control valve unit 17, an operation device 26, an discharge pressure sensor 28, an operation pressure sensor 29, a controller 30, and the like.

In FIG. 3, the hydraulic system is configured to circulate the operating oil from the main pump 14 driven by the engine 11 to the operating oil tank via a center bypass pipe route 40 or a parallel pipe route 42.

The engine 11 is a drive source of the shovel 100. In this embodiment, the engine 11 is, for example, a diesel engine that acts to keep a predetermined number of revolution. The output shaft of the engine 11 is coupled to both of an input shafts of main pump 14 and pilot pumps 15.

The main pump 14 is configured to supply the operating oil to the control valve unit 17 via an operating oil line. In this embodiment, the main pump 14 is a swash plate variable capacity hydraulic pump.

The regulator 13 is configured to control the discharge amount of the main pump 14. In this embodiment, the regulator 13 controls the discharge amount of the main pump 14 by adjusting the tilt angle of the main pump 14 in response to a control command from the controller 30.

The pilot pumps 15 is an example of a pilot pressure generation device configured to supply the operating oil to a hydraulic control device including the operation device 26 via the pilot line. In this embodiment, the pilot pumps 15 is a fixed capacitive hydraulic pump. However, a pilot pressure generation device may be implemented by the main pump 14. That is, the main pump 14 may include a function for supplying the operating oil to the control valve unit 17 via an operating oil line and a function for supplying the operating oil to various hydraulic control devices including the operation device 26 via the pilot line. In this case, the pilot pumps 15 may be omitted.

The control valve unit 17 is a hydraulic controlling device which controls the hydraulic system at the shovel 100. In this embodiment, the control valve unit 17 includes control valves 171-176. The control valve 175 includes a control valve 175L and a control valve 175R, and the control valve 176 includes a control valve 176L and a control valve 176R. The control valve unit 17 is configured to selectively supply the operating oil discharged by the main pump 14 to one or more hydraulic actuators through control valves 171-176. The control valves 171-176 control, for example, the flow of the operating oil from the main pump to the hydraulic actuator and the flow of the operating oil from the hydraulic actuator to the operating oil tank. The hydraulic actuator includes a boom cylinder 7, arm cylinder 8, bucket cylinder 9, left hydraulic travel motor 2ML, right hydraulic travel motor 2MR, and hydraulic swivel motor 2A.

The operation device 26 is configured to supply the operating oil discharged by the pilot pumps 15 to a pilot port of a corresponding control valve in the control valve unit 17 via the pilot line. The pressure (pilot pressure) of the operating oil supplied to each of the pilot ports is the pressure corresponding to an operation direction and an operation amount of the operation device 26 corresponding to each of the hydraulic actuators. However, the type of the operation device 26 may be an electrically controlled type rather than a pilot pressure type described above. In this case, the control valve in the control valve unit 17 may be an electromagnetic solenoid spool valve.

The discharge pressure sensor 28 is configured to detect the discharge pressure of the main pump 14. In this embodiment, the discharge pressure sensor 28 outputs the detected value to the controller 30.

The operation pressure sensor 29 is configured to detect the contents of an operation of the operation device 26 by the operator. In this embodiment, the operation pressure sensor 29 detects pressures (operating pressures) corresponding the operation direction and the operation amount of the operation device 26 that correspond to each of the actuators and outputs the detected value to the controller 30. The contents of the operation of the operation device 26 may be detected using a sensor other than the operation pressure sensor.

The main pump 14 includes a left main pump 14L and a right main pump 14R. The left main pump 14L circulates the operating oil through a left center bypass pipe route 40L or a left parallel pipe route 42L to the operating oil tank, and the right main pump 14R circulates the operating oil through the right center bypass pipe route 40R or the right parallel pipe route 42R to the operating oil tank.

The left center bypass pipe route 40L is an operating oil line running through the control valves 171, 173, 175L and 176L disposed within the control valve unit 17. The right center bypass pipe route 40R is an operating oil line running through control valves 172, 174, 175R and 176R disposed within the control valve unit 17.

The control valve 171 is a spool valve which supplies the operating oil discharged by the left main pump 14L to the left hydraulic travel motor 2ML and switches the flow of the operating oil in order to discharge the operating oil discharged by the left hydraulic travel motor 2ML to the operating oil tank.

The control valve 172 is a spool valve which supplies the operating oil discharged by the right main pump 14R to the right hydraulic travel motor 2MR and switches the flow of the operating oil in order to discharge the operating oil discharged by the right hydraulic travel motor 2MR to the operating oil tank.

The control valve 173 is a spool valve that supplies the operating oil discharged by the left main pump 14L to the hydraulic swivel motor 2A and switches the flow of the operating oil in order to discharge the operating oil discharged by the hydraulic swivel motor 2A to the operating oil tank.

The control valve 174 is a spool valve which supplies the operating oil discharged by the right main pump 14R to the bucket cylinder 9 and switches the flow of the operating oil in order to discharge the operating oil in the bucket cylinder 9 to the operating oil tank.

The control valve 175L is a spool valve which switches the flow of the operating oil in order to supply the operating oil discharged by the left main pump 14L to the boom cylinder 7. The control valve 175R is a spool valve which supplies the operating oil discharged by the right main pump 14R to the boom cylinder 7 and switches the flow of the operating oil in order to discharge the operating oil in the boom cylinder 7 to the operating oil tank.

The control valve 176L is a spool valve which supplies the operating oil discharged by the left main pump 14L to the arm cylinder 8 and switches the flow of the operating oil in order to discharge the operating oil in the arm cylinder 8 to the operating oil tank.

The control valve 176R is a spool valve which supplies the operating oil discharged by the right main pump 14R to the arm cylinder 8 and switches the flow of the operating oil in order to discharge the operating oil in the arm cylinder 8 to the operating oil tank.

The left parallel pipe route 42L is an operating oil line parallel to the left center bypass pipe route 40L. The left parallel pipe route 42L can supply the operating oil to the lower control valve when the flow of the operating oil passing through the left center bypass pipe route 40L is restricted or interrupted by any one from among the control valves 171, 173, and 175L. The right parallel pipe route 42R is the operating oil line parallel to the right center bypass pipe route 40R. The right parallel pipe route 42R can supply the operating oil to a control valve present on a lower stream side when the flow of the operating oil passing through the right center bypass pipe route 40R is restricted or interrupted by any one from among the control valves 172, 174, and 175R.

The regulator 13 includes a left regulator 13L and a right regulator 13R. The left regulator 13L controls the discharge amount of the left main pump 14L by adjusting a swash plate tilting angle of the left main pump 14L in conformity with the discharge pressure of the left main pump 14L. Specifically, the left regulator 13L adjusts the swash plate tilting angle of the left main pump 14L in response to an increase in the discharge pressure of the left main pump 14L so as to reduce the discharge amount. A procedure similar thereto applies to the right regulator 13R. This is in order to prevent the absorption power (absorbed horsepower) of the main pump 14, which is expressed as the product of the discharge pressure and the discharge amount, from exceeding the output power (output horsepower) of the engine 11.

The operation device 26 includes a left operation lever 26L, a right operation lever 26R, and a travel lever 26D. The travel lever 26D includes a left travel lever 26DL and a right travel lever 26DR.

The left operation lever 26L is used for a swivel operation and the operation of the arm 5. The left operation lever 26L, when operated in a forward and backward direction, utilizes the operating oil discharged by the pilot pumps 15 to introduce a control pressure in conformity with the lever operation amount into the pilot port of the control valve 176. When operated in the rightward and leftward direction, the operating oil discharged by the pilot pumps 15 is used to introduce the control pressure in conformity with the lever operation amount into a pilot port of the control valve 173.

Specifically, the left operation lever 26L introduces the operating oil to the right side pilot port of the control valve 176L and introduces the operating oil to the left pilot port of the control valve 176R when operated in the direction of folding the arm. The left operation lever 26L, when operated in the direction of stretching the arm introduces the operating oil to the left pilot port of the control valve 176L and introduces the operating oil to the right pilot port of the control valve 176R. The left operation lever 26L introduces the operating oil to the left pilot port of the control valve 173 when it is operated in the leftward swiveling direction and introduces the operating oil to the right pilot port of the control valve 173 when it is operated in the rightward swiveling direction.

The right operation lever 26R is used to operate the boom 4 and the bucket 6. The right operation lever 26R utilizes the operating oil discharged by the pilot pumps 15 when operated in the forward or backward direction to introduce a control pressure in conformity with the lever operation amount into the pilot port of the control valve 175. When operated in the rightward or leftward direction, the operating oil discharged by the pilot pumps 15 is used to introduce the control pressure in conformity with the amount of lever operated into the pilot port of the control valve 174.

Specifically, the right operation lever 26R introduces the operating oil to the left pilot port of the control valve 175R when operated in the direction of lowering the boom. The right operation lever 26R, when operated in the direction of raising the boom, introduces the operating oil to the right pilot port of the control valve 175L and introduces the operating oil to the left pilot port of the control valve 175R. The right operation lever 26R also introduces the operating oil to the right pilot port of the control valve 174 when it is operated in the direction of closing the bucket, and introduces the operating oil to the left pilot port of the control valve 174 when it is operated in the direction of opening the bucket.

The travel lever 26D is used to operate the crawler 10. Specifically, the left travel lever 26DL is used to operate the left crawler 1CL. It may be configured to interlock with a left travel pedal. The left travel lever 26DL, when operated in the forward or backward direction, utilizes the operating oil discharged by the pilot pumps 15 to introduce a control pressure in conformity with the lever operation amount into the pilot port of the control valve 171. The right travel lever 26DR is used to operate the right crawler 1CR. It may be configured to interlock with a right travel pedal. The right travel lever 26DR, when operated in a forward and backward direction, utilizes the operating oil discharged by the pilot pumps 15 to introduce a control pressure in conformity with the lever operation amount into a pilot port of the control valve 172.

The discharge pressure sensor 28 includes a discharge pressure sensor 28L and a discharge pressure sensor 28R. The discharge pressure sensor 28L detects the discharge pressure of the left main pump 14L and outputs a detected value to the controller 30. The same applies to the discharge pressure sensor 28R.

The operation pressure sensor 29 includes operation pressure sensors 29LA, 29LB, 29RA, 29RB, 29DL, and 29DR. The operation pressure sensor 29LA detects the pressure corresponding to the operator's operation of the left operation lever 26L in the forward or backward direction and outputs the detected value to the controller 30. The contents of the operation are, for example, a lever operation direction and a lever operation amount (lever operation angle).

Similarly, the operation pressure sensor 29LB detects the pressure corresponding to the operator's operation of the left operation lever 26L in the left and right directions and outputs the detected value to the controller 30. An operation pressure sensor 29RA detects the pressure corresponding to the operator's operation of the right operation lever 26R in the forward or backward direction and outputs the detected value to the controller 30. An operation pressure sensor 29RB detects the pressure corresponding to the operator's operation of the right operation lever 26R in the leftward and rightward directions and outputs the detected value to the controller 30. An operation pressure sensor 29DL detects the pressure corresponding to the operator's operation of the left travel lever 26DL in the forward or backward direction and outputs the detected value to the controller 30. An operation pressure sensor 29DR detects the pressure corresponding to the operator's operation of the right travel lever 26DR in the forward and backward directions and outputs the detected value to the controller 30.

The controller 30 receives the output of the operation pressure sensor 29 and outputs a control command to the regulator 13 as needed to change the discharge amount of the main pump 14. The controller 30 receives the output of the control pressure sensor 19 provided on the upstream of the choke 18, outputs a control command to the regulator 13 as necessary, and changes the discharge amount of the main pump 14. The choke 18 includes a left choke 18L and a right choke 18R, and the control pressure sensor 19 includes a left control pressure sensor 19L and a right control pressure sensor 19R.

In the left center bypass pipe route 40L, a left choke 18L is disposed between the control valve 176L, which is the most downstream, and the operating oil tank. Therefore, the flow of the operating oil discharged by the left main pump 14L is restricted by the left choke 18L. The left choke 18L produces a control pressure for controlling the left regulator 13L. The left control pressure sensor 19L is a sensor for detecting this control pressure and outputs a detected value to the controller 30. The controller 30 controls the discharge amount of the left main pump 14L by adjusting the tilting angle of the swash plate of the left main pump 14L in response to the control pressure. The controller 30 decreases the discharge amount of the left main pump 14L as the control pressure increases, and increases the discharge amount of the left main pump 14L as the control pressure decreases. The discharge amount of the right main pump 14R is similarly controlled.

Specifically, when none of the hydraulic actuators at the shovel 100 is in a standby state as illustrated in FIG. 3, the operating oil discharged by the left main pump 14L passes through the left center bypass pipe route 40L until the operating oil reaches the left choke 18L. The flow of the operating oil discharged by the left main pump 14L increases the control pressure generated on the upstream of the left choke 18L. As a result, the controller 30 reduces the discharge amount of the left main pump 14L to an allowable minimum discharge amount and suppresses the pressure loss (pumping loss) when the discharged operating oil passes through the left center bypass pipe route 40L. On the other hand, when any one of the hydraulic actuators is operated, the operating oil discharged by the left main pump 14L flows into the hydraulic actuator to be operated through a control valve corresponding to the hydraulic actuator to be operated. The flow of the operating oil discharged by the left main pump 14L decreases or eliminates the amount reaching the left choke 18L, thereby lowering the control pressure generated on the upstream of the left choke 18L. As a result, the controller 30 increases the discharge amount of the left main pump 14L to circulate the operating oil sufficiently in the hydraulic actuator to be operated to ensure drive of the hydraulic actuator to be operated. The controller 30 controls the discharge amount of the right main pump 14R in the similar manner thereto.

With the configuration described above, the hydraulic system illustrated in FIG. 3 can reduce unnecessary energy consumption at the main pump 14 in the standby state. The unnecessary energy consumption includes a pumping loss caused by the operating oil discharged by the main pump 14 in the center bypass pipe route 40. The hydraulic system illustrated in FIG. 3 also ensures that necessary and sufficient operating oil is supplied from the main pump 14 to the hydraulic actuator to be operated when the hydraulic actuator is operated.

Figure 4A:
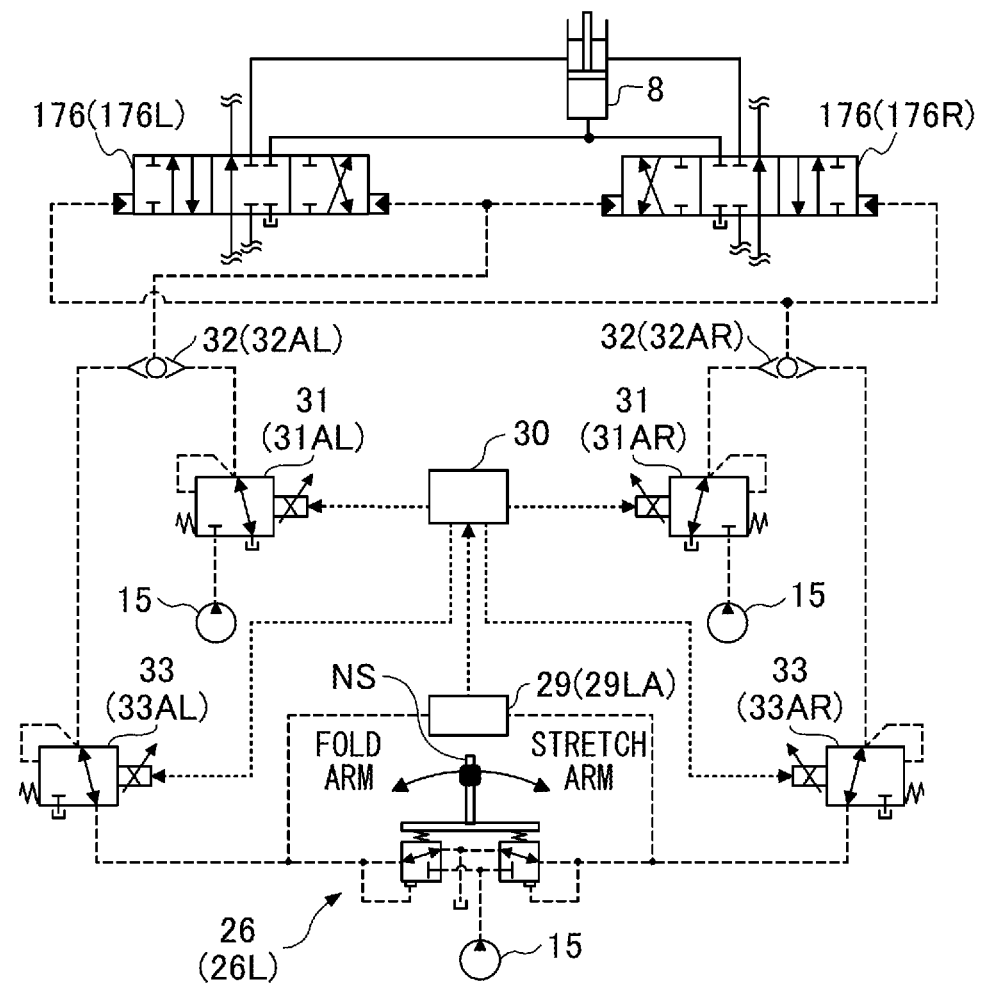
FIG. 4A is a view of a part of the hydraulic system for an operation of an arm cylinder.
Figure 4B:
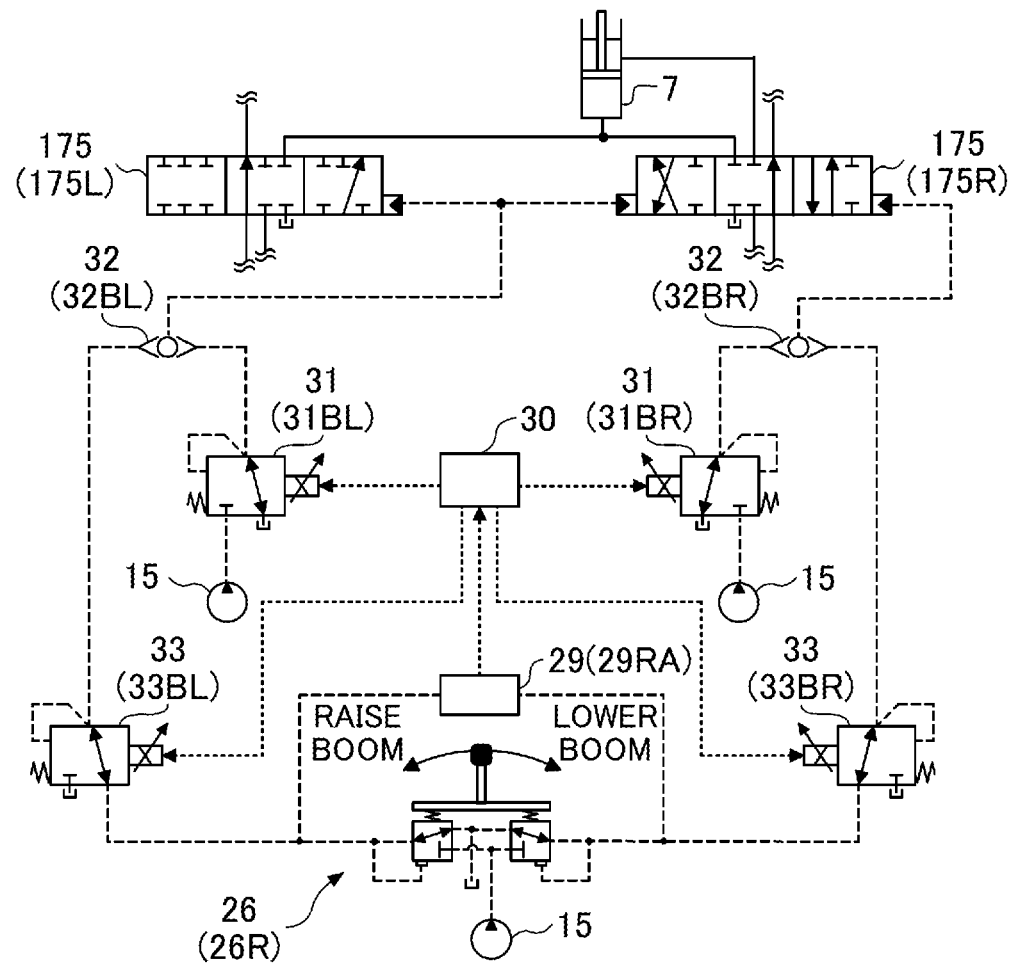
FIG. 4B is a view of a part of the hydraulic system for a boom cylinder.
Figure 4C:
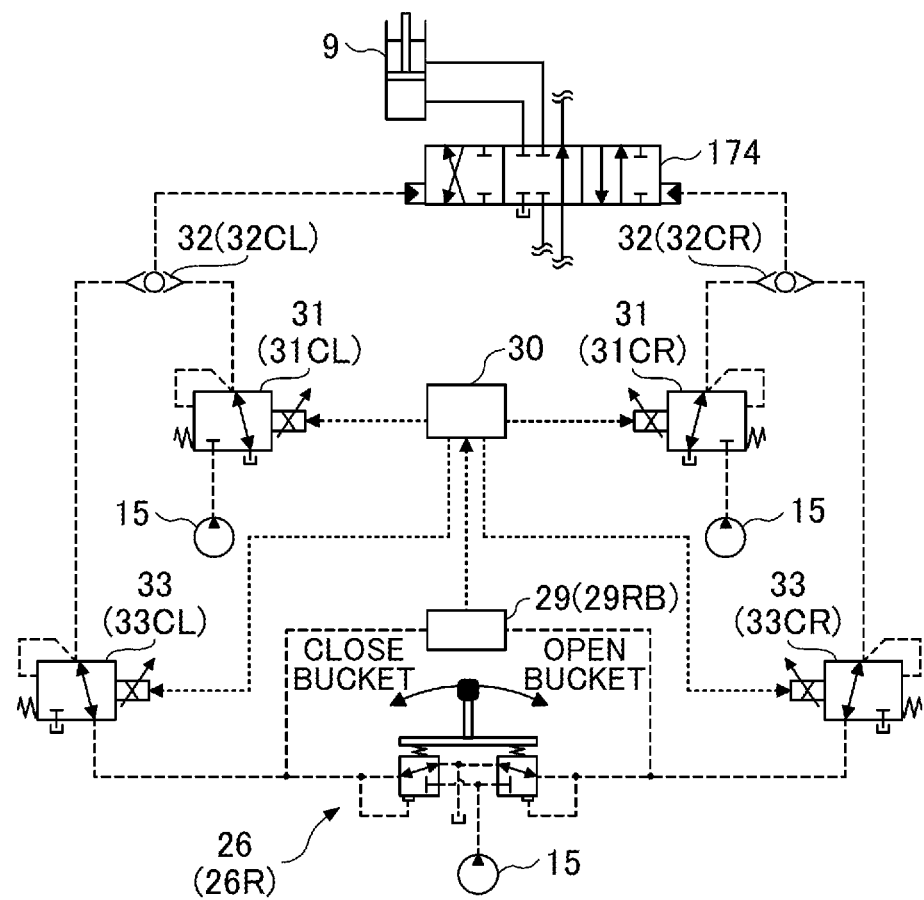
FIG. 4C is a view of a part of the hydraulic system for a bucket cylinder.

Referring to FIGS. 4A-4D, a configuration in which the controller 30 causes the actuator to act by means of a machine control function will be described. FIGS. 4A-4D illustrate portions extracted from the hydraulic system. Specifically, FIG. 4A illustrates the portion of the hydraulic system related to the operation of the arm cylinder 8, and FIG. 4B illustrates the portion of the hydraulic system related to the operation of the boom cylinder 7. FIG. 4C illustrates a portion of the hydraulic system related to the operation of the bucket cylinder 9, and FIG. 4D a portion of the hydraulic system related to the operation of the hydraulic swivel motor 2A.

As illustrated in FIGS. 4A-4D, the hydraulic system includes a proportional valve 31, a shuttle valve 32, and a proportional valve 33. The proportional valve 31 includes proportional valves 31AL-31DL and 31AR-31DR. A shuttle valve 32 includes shuttle valves 32AL-32DL and 32AR-32DR. A proportional valve 33 includes proportional valves 33AL-33DL and 33AR-33DR.

The proportional valve 31 functions as a control valve for controlling a machine. The proportional valve 31 is disposed in a pipe route connecting the pilot pumps 15 to the shuttle valve 32 and is configured to change the flow route area of the pipe route. In this embodiment, the proportional valve 31 acts in response to a control command output by the controller 30. Therefore, the controller 30 can supply the operating oil discharged by the pilot pumps 15 to a pilot port of the corresponding control valve in the control valve unit 17 through the proportional valve 31 and shuttle valve 32, independent of the operator's operation of the operation device 26.

The shuttle valve 32 has two inlet ports and one outlet port. One of the two inlet ports is connected to the operation device 26 and the other is connected to the proportional valve 31. The outlet port is connected to a pilot port of a corresponding control valve in the control valve unit 17. Thus, the shuttle valve 32 can cause the higher of the pilot pressure generated by the operation device 26 and the pilot pressure generated by the proportional valve 31 to act on the pilot port of the corresponding control valve.

The proportional valve 33 functions as a machine control valve in a similar manner to the proportional valve 31. The proportional valve 33 is disposed in the pipe route connecting the operation device 26 to the shuttle valve 32 and is configured to change the flow route area of the pipe route. In this embodiment, the proportional valve 33 acts in response to control commands output by the controller 30. Therefore, the controller 30 can reduce the pressure of the operating oil discharged by the operation device 26 and supply the operating oil to the pilot port of the corresponding control valve in the control valve unit 17 through the shuttle valve 32, independent of the operation of the operation device 26 by the operator.

With this configuration, the controller 30 may operate the hydraulic actuator corresponding to a particular operation device 26 even if Po operation is given to the particular operation device 26. The controller 30 may also forcibly stop the action of the hydraulic actuator corresponding to a particular operation device 26 even when the operation is not given to the particular operation device 26.

For example, as illustrated in FIG. 4A, the left operation lever 26L is used to operate the arm 5. Specifically, the left operation lever 26L utilizes the operating oil discharged by the pilot pumps 15 to apply a pilot pressure to the pilot port of the control valve 176 in response to operation in the forward or backward direction. More specifically, the left operation lever 26L acts on the right pilot port of the control valve 176L and the left pilot port of the control valve 176R in conformity with the operation amount when operated in the arm folding direction (backward direction). When the left operation lever 26L is operated in the direction of stretching the arm (forward direction), the left operation lever 26L acts on the left pilot port of the control valve 176L and the right pilot port of the control valve 176R in conformity with the operation amount.

The left operation lever 26L is provided with a switch NS. In this embodiment, the switch NS is a push-button switch provided at the front edge of the left operation lever 26L. The operator can operate the left operation lever 26L while pressing the switch NS. The switch NS may be provided on the right operation lever 26R or at other locations within the cabin 10.

The operation pressure sensor 29LA detects the pressure corresponding to the operator's operation of the left operation lever 26L in the forward or backward direction and outputs the detected value to the controller 30.

The proportional valve 31AL acts in response to a control command (a current command) output by the controller 30. A pilot pressure is adjusted by the operating oil introduced from the pilot pumps 15 to the right pilot port of the control valve 176L and the left pilot port of the control valve 176R through the proportional valve 31AL and shuttle valve 32AL. The proportional valve 31AR acts in response to a control command (current command) output by the controller 30. The operating oil introduced from the pilot pumps 15 through the proportional valve 31AR and the shuttle valve 32AR into the left pilot port of the control valve 176L and the right pilot port of the control valve 176R adjusts the pilot pressure. The proportional valves 31AL, 31AR can adjust the pilot pressure so that the control valves 176L, 176R can be stopped at freely-selected valve positions, respectively.

This configuration allows the controller to supply the operating oil discharged by the pilot pumps 15 to the right pilot port of the control valve 176L and the left pilot port of the control valve 176R through the proportional valve 31AL and the shuttle valve 32AL, independent of the operator's operation of folding the arm. That is, the arm 5 can be folded. The controller 30 may also supply the operating oil discharged by the pilot pumps 15 to the left pilot port of the control valve 176L and the right pilot port of the control valve 176R through the proportional valve 31AR and shuttle valve 32AR, independent of the operator's operation of stretching the arm. That is, the arm 5 can be stretched.

The proportional valve 33AL acts in response to a control command (a current command) output by the controller 30. The pilot pressure caused by the operating oil introduced from the pilot pumps 15 to the right pilot port of the control valve 176L and the left pilot port of the control valve 176R through the left operation lever 26L, the proportional valve 33AL, and the shuttle valve 32L is reduced. The proportional valve 33AR acts in response to a control command (current command) output by the controller 30. The pilot pressure is then reduced by the operating oil introduced from the pilot pumps 15 through the left operation lever 26L, the proportional valve 33AR, and the shuttle valve 32AR to the left pilot port of the control valve 176L and the right pilot port of the control valve 176R. The proportional valves 33AL and 33AR can adjust the pilot pressure so that the control valves 176L and 176R can be stopped at the freely-selected valve positions, respectively.

With this configuration, the controller can depressurize the pilot pressure acting on the pilot port (the left pilot port of the control valve 176L and the right pilot port of the control valve 176R) on the closing side of the control valve 176 and forcibly stop the action of folding the arm 5, if necessary, even when the operation of folding the arm is performed. The same is applied to a case where the action of stretching the arm 5 is forcibly stopped while the operator's operation of stretching the arm is performed.

Alternatively, even when the operation of folding the arm is performed, the controller 30 may control, if necessary, the proportional valve 31AR to increase the pilot pressure acting on the pilot port (the right pilot port of the control valve 176L and the left pilot port of the control valve 176R) on an open side of the control valve 176 opposite the pilot port on a closed side of the control valve 176. By doing so, the control valve 176 may be forcibly returned to the neutral position to stop the action of folding the arm 5. In this case, the proportional valve 33AL may be omitted. The same is applied to a case where the action of stretching the arm is forcibly stopped while the operator's operation of stretching the arm is performed.

Figure 4D:
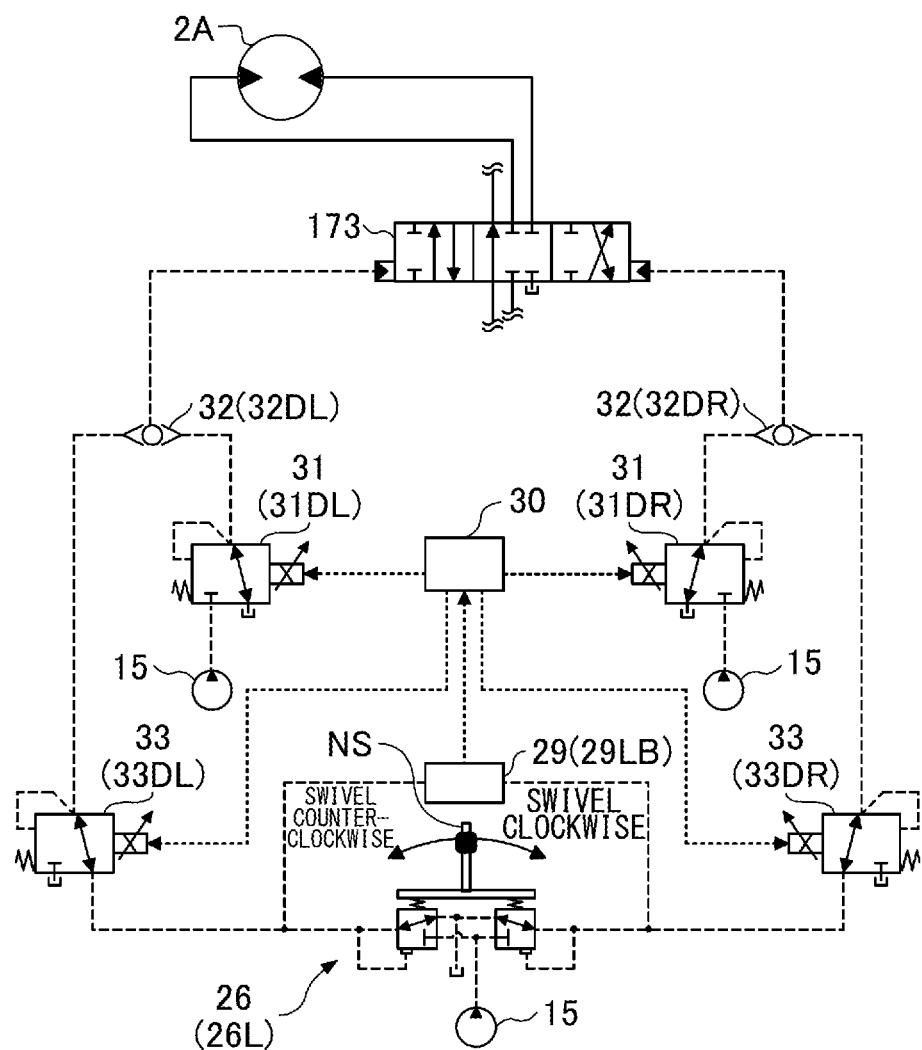
FIG. 4D is a view of a part of the hydraulic system for a hydraulic swivel motor.

Although the description referring to FIGS. 4B to 4D is omitted, the same is applied to a case where the action of the boom 4 is forcibly stopped when a user's operation of raising the boom or a user's operation of lowering the boom is performed, a case where the action of the bucket 6 is forcibly stopped when the operator's operation of closing the bucket or the operator's operation of opening the bucket is performed, and a case where the action of swiveling the upper-part swiveling body 3 is forcibly stopped in when the operator's operation of swiveling the upper-part swiveling body 3 is performed. The same is applied to the case where a travel action of the lower-part traveling body 1 is forcibly stopped in a case where an operator's travel operation is performed.

Also, as illustrated in FIG. 4B, the right operation lever 26R is used to operate the boom 4. Specifically, the right operation lever 26R utilizes the operating oil discharged by the pilot pumps 15 to apply a pilot pressure to the pilot port of the control valve 175 in response to the operation in the forward or backward direction. More specifically, the right operation lever 26R acts on the right pilot port of the control valve 175L and the left pilot port of the control valve 175R in conformity with the operation amount when the right operation lever 26R is operated in the direction of raising the boom (backward direction). When the right operation lever 26R is operated in the direction of lowering the boom (forward direction), the pilot pressure is applied to the right pilot port of the control valve 175R in conformity with the operation amount.

The operation pressure sensor 29RA detects the pressure corresponding to the operator's operation of the right operation lever 26R in the forward or backward direction and outputs the detected value to the controller 30.

The proportional valve 31BL acts in response to a control command (current command) output by the controller 30. The proportional valve 31BL adjusts the pressure of the operating oil introduced from the pilot pumps 15 through the proportional valve 31BL and the shuttle valve 32BL into the right pilot port of the control valve 175L and the left pilot port of the control valve 175R. The proportional valve 31BR acts in response to a control command (current command) output by the controller 30. The pilot pressure caused by the operating oil introduced from the pilot pumps 15 through the proportional valve 31BR and the shuttle valve 32BR into the left pilot port of the control valve 175L and the right pilot port of the control valve 175R is then adjusted. The proportional valves 31BL, 31BR can adjust the pilot pressure so that the control valves 175L, 175R can be stopped at the freely-selected valve positions.

This configuration enables the controller 30 to supply the operating oil discharged by the pilot pumps 15 to the right pilot port of the control valve 175L and the left pilot port of the control valve 175R through the proportional valve 31BL and shuttle valve 32BL, independent of the operator's operation of raising the boom. That is, the boom 4 can be raised. The controller 30 may also supply the operating oil discharged by the pilot pumps 15 to the right pilot port of the control valve 175R through the proportional valve 31BR and the shuttle valve 32BR, independent of the operator's operation of lowering the boom. That is, the boom 4 can be lowered.

As illustrated in FIG. 4C, the right operation lever 26R is also used to operate the bucket 6. Specifically, the right operation lever 26R utilizes the operating oil discharged by the pilot pumps 15 to apply a pilot pressure to the pilot port of the control valve 174 in conformity with the operation in the left and right directions. More specifically, the right operation lever 26R applies the pilot pressure corresponding to the operation amount to the left pilot port of the control valve 174 in a case where the bucket is operated to move in the closing direction (left direction). The right operation lever 26R applies the pilot pressure in conformity with the operation amount to the right pilot port of the control valve 174 in a case where the bucket is operated to move in the opening direction (right direction).

The operation pressure sensor 29RB detects the pressure corresponding to the operator's operation of the right operation lever 26R in the left and right directions and outputs the detected value to the controller 30.

The proportional valve 31CL acts in response to the control command (current command) output by the controller 30. The pilot pressure caused by the operating oil introduced from the pilot pumps 15 to the left pilot port of the control valve 174 through the proportional valve 31 CL and shuttle valve 32 CL is adjusted. The proportional valve 31CR acts in response to the control command (current command) output by the controller 30. The pilot pressure is then adjusted by the operating oil introduced from the pilot pumps 15 to the right pilot port of the control valve 174 via the proportional valve 31CR and the shuttle valve 32CR. The proportional valves 31CL, 31CR can adjust the pilot pressure so that the control valve 174 can be stopped at the freely-selected valve positions.

This configuration enables the controller 30 to supply the operating oil discharged by the pilot pumps 15 to the left pilot port of the control valve 174 via the proportional valve 31CL and shuttle valve 32CL, independent of the operator's operation of closing the bucket. That is, the bucket 6 can be closed. The controller 30 may also supply the operating oil discharged by the pilot pumps 15 to the right pilot port of the control valve 174 through the proportional valve 31CR and shuttle valve 32CR, independent of the operator's bucket opening operation.

That is, bucket 6 can be opened.

As illustrated in FIG. 4D, the left operation lever 26L is also used to operate the swivel mechanism 2. Specifically, the left operation lever 26L utilizes the operating oil discharged by the pilot pumps 15 to apply the pilot pressure in conformity with the operation in the left and right directions to the pilot port of the control valve 173. More specifically, the left operation lever 26L applies the pilot pressure corresponding to the operation amount to the left pilot port of the control valve 173 in a case where the left operation lever 26L is operated in the counterclockwise swiveling direction (left direction). Further, in a case where the left operation lever 26L is operated in the counterclockwise swiveling direction (left direction), the pilot pressure in conformity with the operation amount is applied to the right pilot port of the control valve 173.

The operation pressure sensor 29LB detects the contents of the operation in the left and right direction relative to the left operation lever 26L by the operator as the form of the pressure and outputs the detected value to the controller 30.

The proportional valve 31DL acts in response to the control command (current command) output by the controller 30. The pilot pressure is adjusted by the operating oil introduced from the pilot pumps 15 to the left pilot port of the control valve 173 through the proportional valve 31 DL and shuttle valve 32 DL. The proportional valve 31DR acts in response to the control command (current command) output by the controller 30. Then, the pilot pressure caused by the operating oil introduced from the right pilot pump from among the pilot pumps 15 to the right pilot port of the control valve 173 via the proportional valve 31DR and the shuttle valve 32DR is adjusted. The proportional valves 31DL, 31DR can adjust the pilot pressure so that the control valve 173 can be stopped at the freely-selected valve positions.

This configuration enables the controller 30 to supply the operating oil discharged by the pilot pumps 15 to the left pilot port of the control valve 173 through the proportional valve 31DL and shuttle valve 32DL, independent of the operator's operation of counterclockwise swiveling the swivel mechanism 2. That is, the swivel mechanism 2 can be made to counterclockwise swivel. The controller 30 may also supply the operating oil discharged by the pilot pumps 15 to the right pilot port of the control valve 173 via the proportional valve 31DR and the shuttle valve 32DR, independent of the operator's operation of counterclockwise swiveling the swivel mechanism 2. That is, the swivel mechanism 2 can be counterclockwise swiveled.

The shovel 100 may be configured to automatically cause the lower-part traveling body 1 to travel forward and backward. In this case, a hydraulic system portion related to the operation of the left hydraulic travel motor 2ML and a hydraulic system portion related to the operation of the right hydraulic travel motor 2MR may be configured to be similar to a hydraulic system portion related to the operation of the boom cylinder 7.

Also, although a description has been given of a hydraulic operation lever having a hydraulic pilot circuit as a mode of the operation device 26, an electric operation lever having an electric pilot circuit rather than the hydraulic operation lever may be employed. In this case, the lever operation amount of the electric operation lever is input to the controller 30 as an electric signal. A solenoid valve is also disposed between the pilot pumps 15 and the pilot port of each control valve. The solenoid valve is configured to act in response to the electric signal from the controller 30. This configuration enables the controller 30 to control electromagnetic valves by the electric signal corresponding to the lever operation amount to increase or decrease the pilot pressure to move each control valve when it is manually operated using an electric operation lever. Each control valve may be composed of an electromagnetic spool valve. In this case, the electromagnetic spool valve acts in response to electrical signals from the controller 30 corresponding to the level of lever operation of the electric operation lever.

Figure 5:
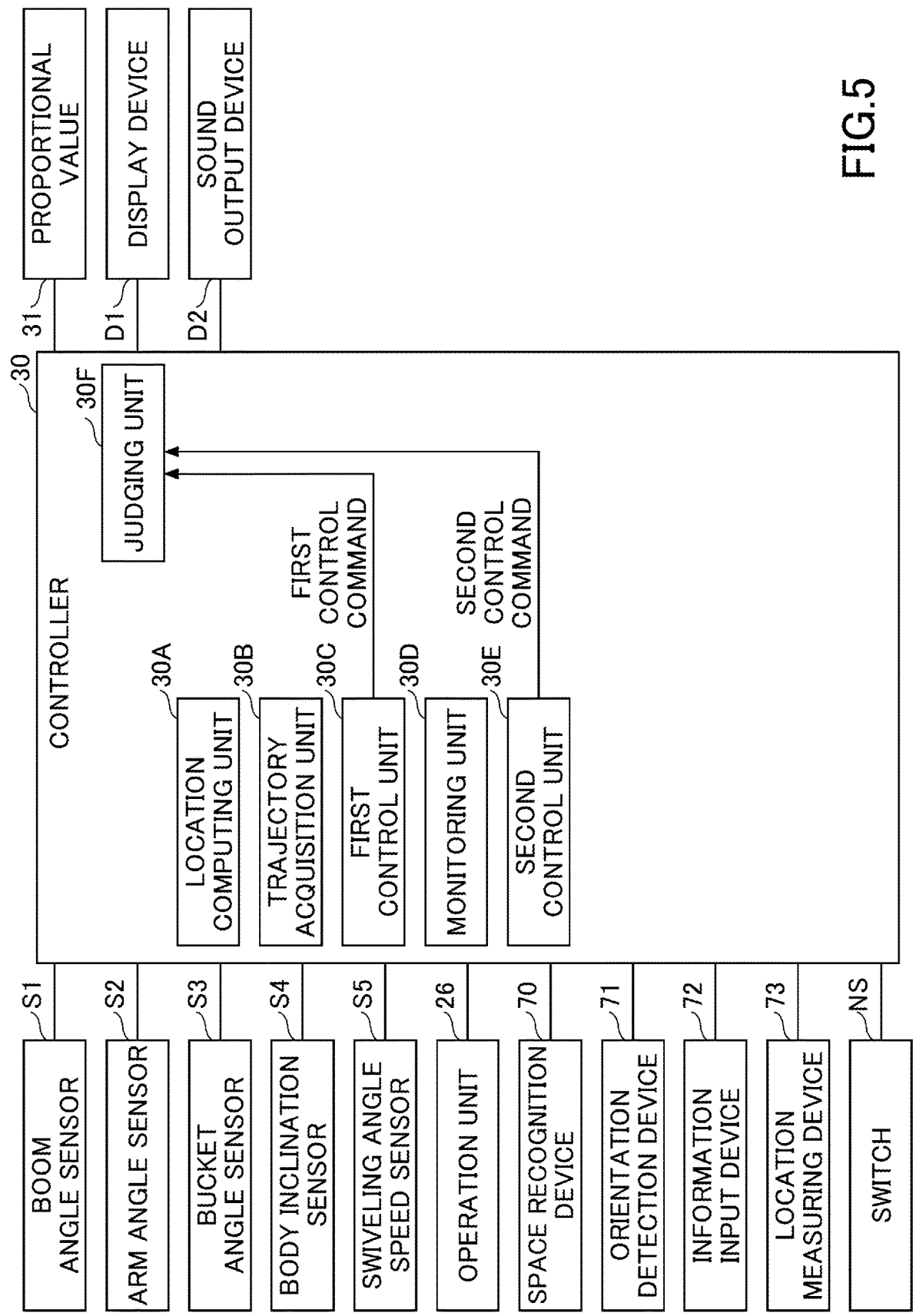
FIG. 5 is a view illustrating an example of the configuration of a controller.

Next, an example of the configuration of the controller 30 will be described with reference to FIG. 5. FIG. 5 is a diagram illustrating an example of the configuration of the controller 30. In FIG. 5, the controller 30 is configured to receive signals output by at least one of the attitude detecting device, the operation device 26, the space recognition device 70, the orientation detection device 71, the information input device 72, the location measuring device 73, and the switch NS, perform various operations, and output control commands to at least one of the proportional valve 31, the display device D1, and the sound output device D2. The attitude detecting device includes a boom angle sensor S1, an arm angle sensor S2, a bucket angle sensor S3, a body inclination sensor S4, and a swiveling angle speed sensor S5. The controller 30 includes a location computing unit 30A, a trajectory acquisition unit 30B, a first control unit 30C that implements a first process, a monitoring unit 30D, a second control unit 30E that implements a second process, and a judging unit 30F as functional elements. Each functional element may be made of hardware or software. The location computing unit 30A, the trajectory acquisition unit 30B, the first control unit 30C, the monitoring unit 30D, the second control unit 30E, and the judging unit 30F are illustrated and distinguished for convenience of illustration, but need not be physically distinguished and may be composed of software components or hardware components that are generally or partially common.

The location computing unit 30A is configured to calculate the location of the positioning target. In this embodiment, the location computing unit 30A computes the coordinate point in the reference coordinate system of a predetermined portion of the attachment. The predetermined portion is, for example, the front edge of the bucket 6. The origin of the reference coordinate system is, for example, the intersection of the swivel axis and the ground plane of the shovel 100. The reference coordinate system is, for example, an XYZ orthogonal coordinate system and has an X axis parallel to the front and rear axis of the shovel 100, a Y axis parallel to the left and right axis of the shovel 100, and a Z axis parallel to the swivel axis of the shovel 100. The location computing unit 30A computes the coordinate point of the front edge of the bucket 6 from the rotation angles of the boom 4, the arm 5, and the bucket 6, for example. The location computing unit 30A may calculate not only the coordinate point of the center of the front edge of the bucket 6 but also the coordinate point of the left end of the front edge of the bucket 6 and the coordinate point of the right end of the front edge of the bucket 6. In this case, the location computing unit 30A may utilize the output of the body inclination sensor S4.

The trajectory acquisition unit 30B is configured to acquire a target trajectory which is a trajectory depicted by a predetermined portion of the attachment when the shovel 100 acts autonomously. In this embodiment, the trajectory acquisition unit 30B acquires the target trajectory used when the first control unit 30C causes the shovel 100 to act autonomously. Specifically, the trajectory acquisition unit 30B derives the target trajectory based on data concerning a target work surface stored in the non-volatile memory device. The trajectory acquisition unit 30B may derive the target trajectory based on information about the terrain around the shovel 100 recognized by the space recognition device 70. Alternatively, the trajectory acquisition unit 30B may derive information about the past trajectory of the front edge of the bucket 6 from a past output of the attitude detecting device stored in a volatile memory device and derive the target trajectory based on the information. Alternatively, the trajectory acquisition unit 30B may derive the target trajectory based on the present position of a predetermined portion of the attachment and data about the target work surface.

The first control unit 30C is configured so that the shovel 100 can be caused to act autonomously. In this embodiment, the trajectory acquisition unit 30B is configured to move a predetermined portion of the attachment along the target trajectory acquired by the trajectory acquisition unit 30B in a case where a predetermined start condition is satisfied. Specifically, when the shovel 100 acts autonomously so that the predetermined portion moves along the target trajectory when the operation device 26 is operated while the switch NS is being depressed.

In this embodiment, the first control unit 30C is configured to assist the operator's manual operation of the shovel by causing the actuator to act autonomously. For example, the first control unit 30C may autonomously expand and shorten at least one from among the boom cylinder 7, the arm cylinder 8, and the bucket cylinder 9 so that the target trajectory and the position of the front edge of the bucket 6 are matched while the operator manually folding the arm by pressing the switch NS. In this case, the operator can fold the arm 5 while making the front edge of the bucket trace the target trajectory, for example, by operating the left operation lever 26L in the direction of folding the arm. In this example, the arm cylinder 8, which is the main operation target, is referred to as a "main actuator". The boom cylinder 7 and the bucket cylinder 9, which act in subordination to the action of the main actuator, are referred to as a "subordinate actuator".

In this embodiment, the first control unit 30C can independently adjust the pilot pressure acting on the control valves corresponding to actuators by providing the proportional valve with the control command (current command), thereby enabling each actuator to act autonomously. For example, at least one from among the boom cylinder 7 and the bucket cylinder 9 can act regardless of whether the right operation lever 26R is tilted or not.

The monitoring unit 30D is configured to monitor the perimeter of the shovel 100. In this embodiment, the monitoring unit 30D detects objects that may come into contact with a portion of the shovel 100 based on the output of the space recognition device 70. When a potentially contacting object is detected, the monitoring unit 30D may use known techniques such as image recognition processing to determine whether the object is a predetermined object. The predetermined object includes an freely-selected object such as, for example, a person, an electric wire, a shovel, a tree, a pole, a road cone, or a guardrail. That is, the monitoring unit 30D may be configured to identify at least one from among the type, location, shape, and the like of the recognized object based on the output of the space recognition device 70.

The second control unit 30E is configured to autonomously cause the shovel 100 to act independent of the first control unit 30C. Within this embodiment, in a case where an object that may be in contact with a portion of the shovel 100 is detected by the monitoring unit 30D, the second control unit 30E is configured to move the attachment while avoiding the contact or stop the attachment in order to avoid the contact. Specifically, while a complex action is performed by causing a plurality of hydraulic actuators to act, the second control unit 30E prevents a portion of the shovel 100 from contacting the object detected by the monitoring unit 30D. At this time, the second control unit 30E makes one action a plurality of hydraulic actuators continues while continuing the movement of one of the plurality of hydraulic actuators. For example, when a complex excavation action is performed by moving the boom cylinder 7 and the arm cylinder 8, the second control unit 30E restricts the extension of the boom cylinder 7 while continuing the extension of the arm cylinder 8, thereby preventing the back face of the boom 4 from contacting the object existing above the boom 4 detected by the monitoring unit 30D.

The judging unit 30F is configured to determine whether the conflict occurs in a plurality of control units. The judging unit 30F is configured to select one of the plurality of control units as a priority control unit that implements a priority control process causing the selected one to act preferentially when it is determined that the conflict is occurring.

In this embodiment, the plurality of control units includes the first control unit 30C and the second control unit 30E. The judging unit 30F judges whether the conflict occurs between the first control command output by the first control unit 30C and the second control command output by the second control unit 30E. For example, in a case where the first control command includes a control command for extending the boom cylinder 7 and the second control command includes a control command for shortening or stopping the boom cylinder 7, the judging unit 30F judges that the conflict occurs. In a case where it is determined that the conflict occurs, the judging unit 30F selects one control unit from among the plurality of control units as a priority control unit that causes the plurality of control units to preferentially act in conformity with a predetermined priority order for each of the plurality of control units. In this embodiment, the priority order of the second control unit 30E is set to be higher than the priority order of the first control unit 30C. Therefore, in a case where the conflict is determined to occur between the first control command and the second control command, the judging unit 30F selects the second control unit 30E as the priority control unit. As a result, the judging unit 30F outputs a final control command including a control command to shorten or stop the boom cylinder 7 to the proportional valve 31.

Figure 6A:
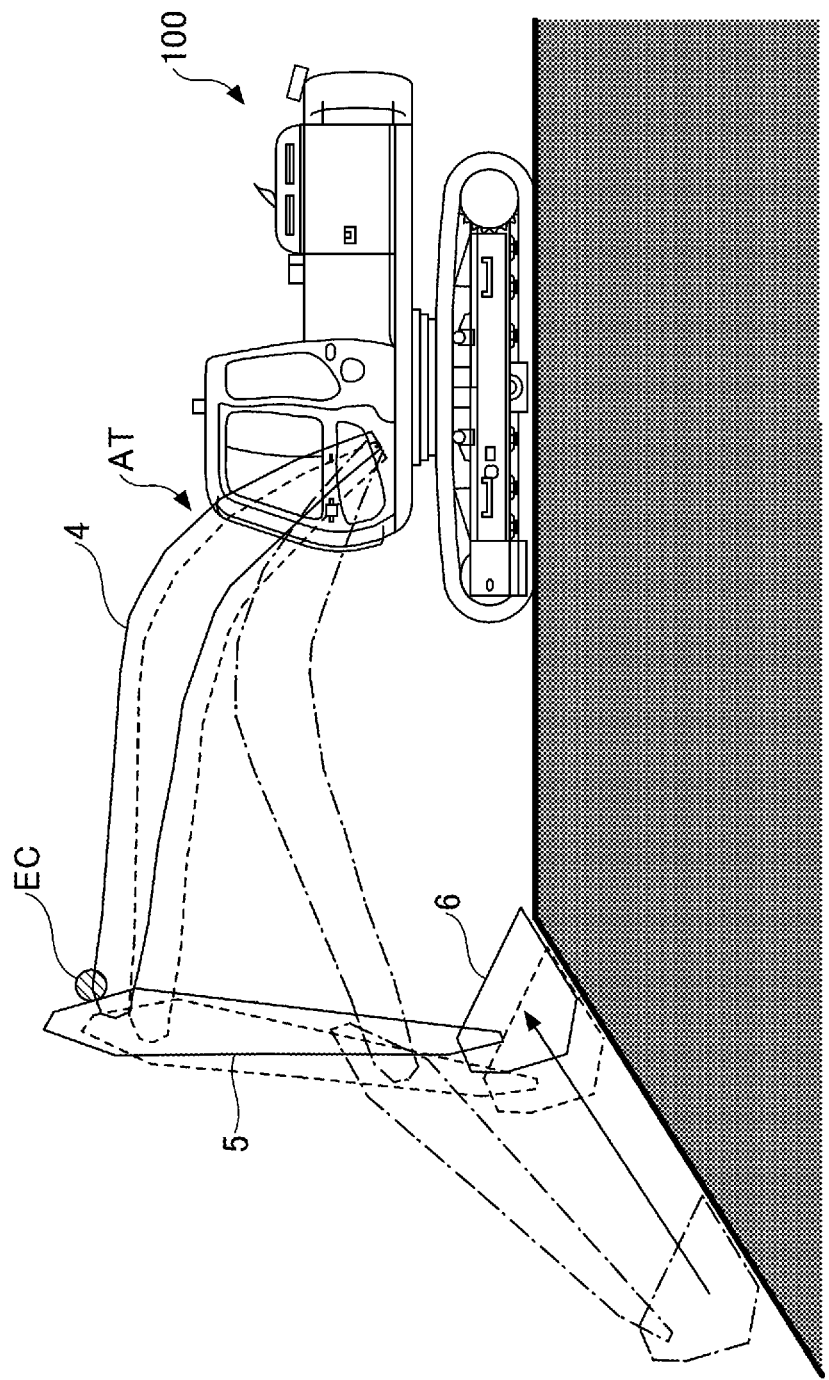
FIG. 6A is a side view of the shovel performing descent slope surface shaping work.
Figure 6B:
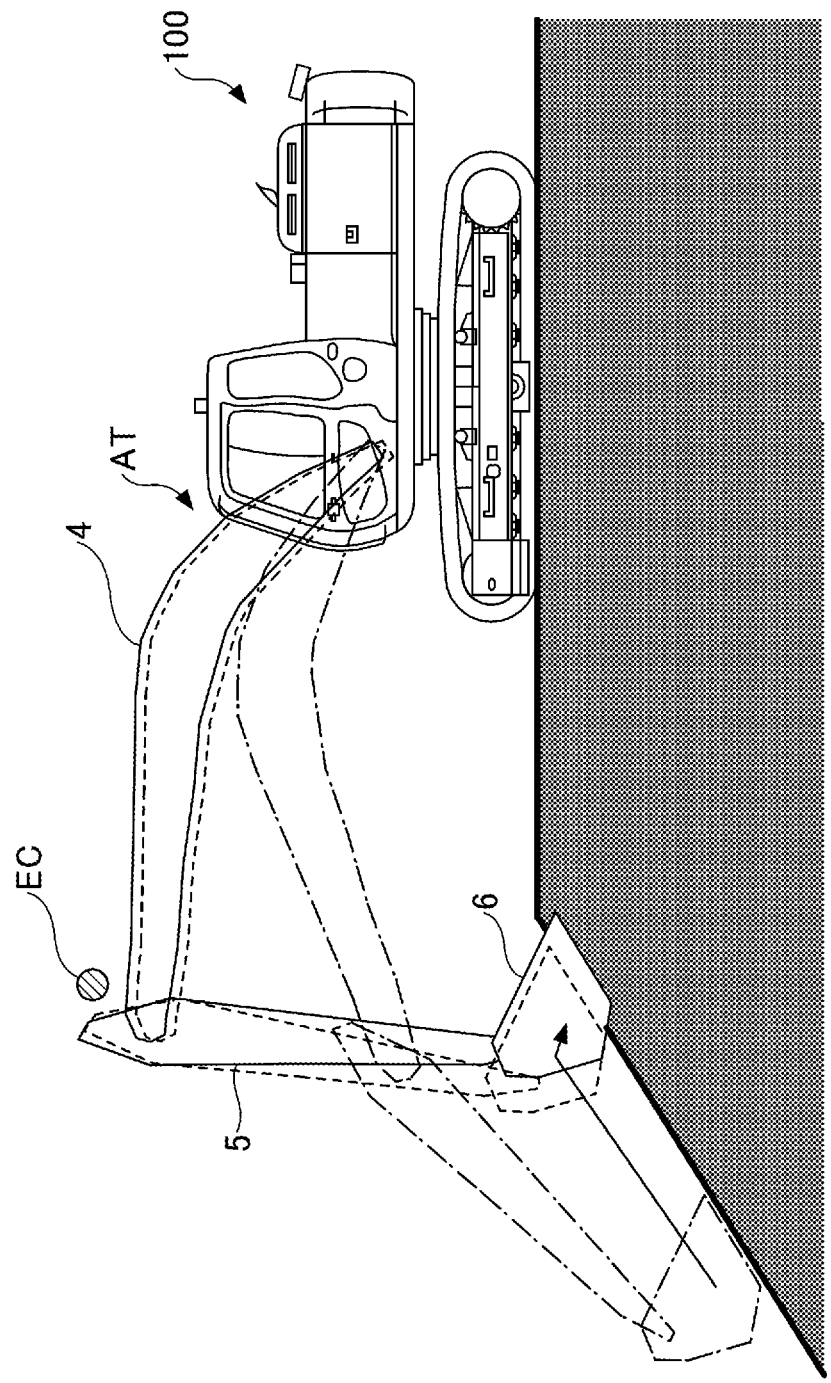
FIG. 6B is a side view of the shovel performing descent slope surface shaping work.

Referring now to FIGS. 6A to 6C, an example of a process of selecting one control unit as the priority control unit in a case where the conflict occurs among a plurality of control units will be described. FIGS. 6A-6C are side views of the shovel 100 performing a finishing operation on a target work surface (downward slope or horizontal plane). In FIGS. 6A-6C, a plurality of controls includes a first control unit 30C for autonomously operating the attachment actuator such that the target work surface (descent slope or horizontal plane) coincides with the predetermined part of the attachment (front edge or back face of bucket 6), and a second control unit 30E for causing to act autonomously or stopping the attachment actuator such that the excavation attachment AT does not contact objects within the surrounding monitoring area.

FIG. 6A illustrates an action of the shovel 100 in a case where the first control unit 30C is selected as the priority control unit when conflict occurs between the first control unit 30C and the second control unit 30E. FIGS. 6B and 6C illustrate the action of the shovel 100 in a case where the conflict between the first control unit 30C and the second control unit 30E occurs and the second control unit 30E is selected as the priority control unit.

In FIGS. 6A-6C, the excavation attachment AT designated by a dashed line indicates the state of the excavation attachment AT when the operator manually starts the operation of folding the arm and the operation of stretching the arm while the operator depresses the switch NS, namely, when the control by the first control unit 30C is started. The excavation attachment AT designated by the dashed line indicates the state of the excavation attachment AT when the first control unit 30C and the second control unit 30E start to compete. The excavation attachment AT designated by a solid line indicates the present state of the excavation attachment AT status after it is controlled by the priority control unit.

Specifically, as illustrated in FIGS. 6A to 6C, until the conflict start to occur between the first control unit 30C and the second control unit 30E, the controller 30 moves a predetermined portion of the bucket 6 along the target work surface by the first control unit 30C. Specifically, in examples illustrated in FIGS. 6A and 6B, namely, the controller 30 makes the front edge of the bucket 6 to move along in the descent slope in an example in which a finishing work is performed mainly by the operation of folding the arm, the controller 30 moves the front edge of the bucket 6 down and along the slope. In the example illustrated in FIG. 6C, in which the finishing work of the horizontal surface (land leveling work) of the horizontal face is performed mainly by the operation of stretching the arm, the controller 30 moves the bucket 6 while overlapping the back face of the bucket 6 with the horizontal surface.

Thereafter, in the example illustrated in FIGS. 6A and 6B, the monitoring unit 30D of the controller 30 detects the object EC based on the output of an upper sensor, for example, which recognizes an object present in a space above the upper-part swiveling body 3, and determines that there is a risk of contacting between the back face of the boom 4 and the object EC. The object EC is, for example, a branch of a tree existing directly above the boom 4.

In FIG. 6A, the judging unit 30F of the controller 30 receives the first control command from the first control unit 30C and the second control command from the second control unit 30E, and determines whether there is the conflict between the first control command and the second control command. At this time, the first control command includes a control command for extending the boom cylinder 7, and the second control command includes a control command for stopping the boom cylinder 7. Therefore, the judging unit 30F judges that there is the conflict between the first control command and the second control command, and selects the first control unit 30C as the priority control unit based on the predetermined priority order.

As a result, the back face of the boom 4 contacts the object EC, but the front edge of the bucket 6 moves along the slope surface. This control enables the operator to continue the finishing work for the slope until the front edge of the bucket 6 reaches the shoulder to form the slope as the target work surface.

In FIG. 6B, when it is determined that the first control command and the second control command compete, the judging unit 30F selects the second control unit 30E as the priority control unit based on the predetermined priority order.

Therefore, the judging unit 30F outputs the final control command including the control command to stop the boom cylinder 7 to the proportional valve 31. In the example illustrated in FIG. 6B, the judging unit 30F is configured to include a control command for extending the arm cylinder 8 included in the first control command output by the first control unit 30C, which is not selected as the priority control unit, in the final control command. This is because the conflict does not occur regarding control command for the arm cylinder 8.

As a result, the front edge of the bucket excavates the slope surface beyond the target work surface, but the back face of the boom 4 does not contact the object EC. With this control, the operator can prevent the back of the boom 4 from contacting the object EC. In addition, the operator can prevent the front edge of the bucket 6 from entering the slope excessively by immediately stopping the operation of folding the arm when the operator notices that the front edge of the bucket 6 has excavated the slope beyond the target work surface.

However, the judging unit 30F may be configured such that the control command related to the arm cylinder 8 included in the first control command output by the first control unit 30C that is not selected as the priority control unit is not included in the final control command. In this case, the judging unit 30F may be configured to stop the arm cylinder 8. In FIG. 6C, the monitoring unit 30D detects an object EC based on the output of an attachment sensor AS that recognizes the object EC present in a space in the direction of stretching the arm, and determines that there is a possibility that the excavation attachment AT contacts the object EC. The object EC is, for example, a worker present forward the shovel 100. The attachment sensor AS as an object sensing device is an example of the space recognition device 70 and is mounted to the back face of the arm 5. In the example illustrated in FIG. 6C, when it is determined the first control command and the second control command compete, the judging unit 30F selects the second control unit 30E as the priority control. unit based on the predetermined priority order. Therefore, the judging unit 30F outputs the final control command including a control command to stop the arm cylinder 8 to the proportional valve 31. In the example illustrated in FIG. 6C, the judging unit 30F is configured not to include, in the final control command, the control command related to the boom cylinder 7 included in the first control command output by the first control unit 30C, which is not selected as the priority control unit. In this case, the judging unit 30F may stop the boom cylinder 7. The same applies to the bucket cylinder 9.

Figure 7:
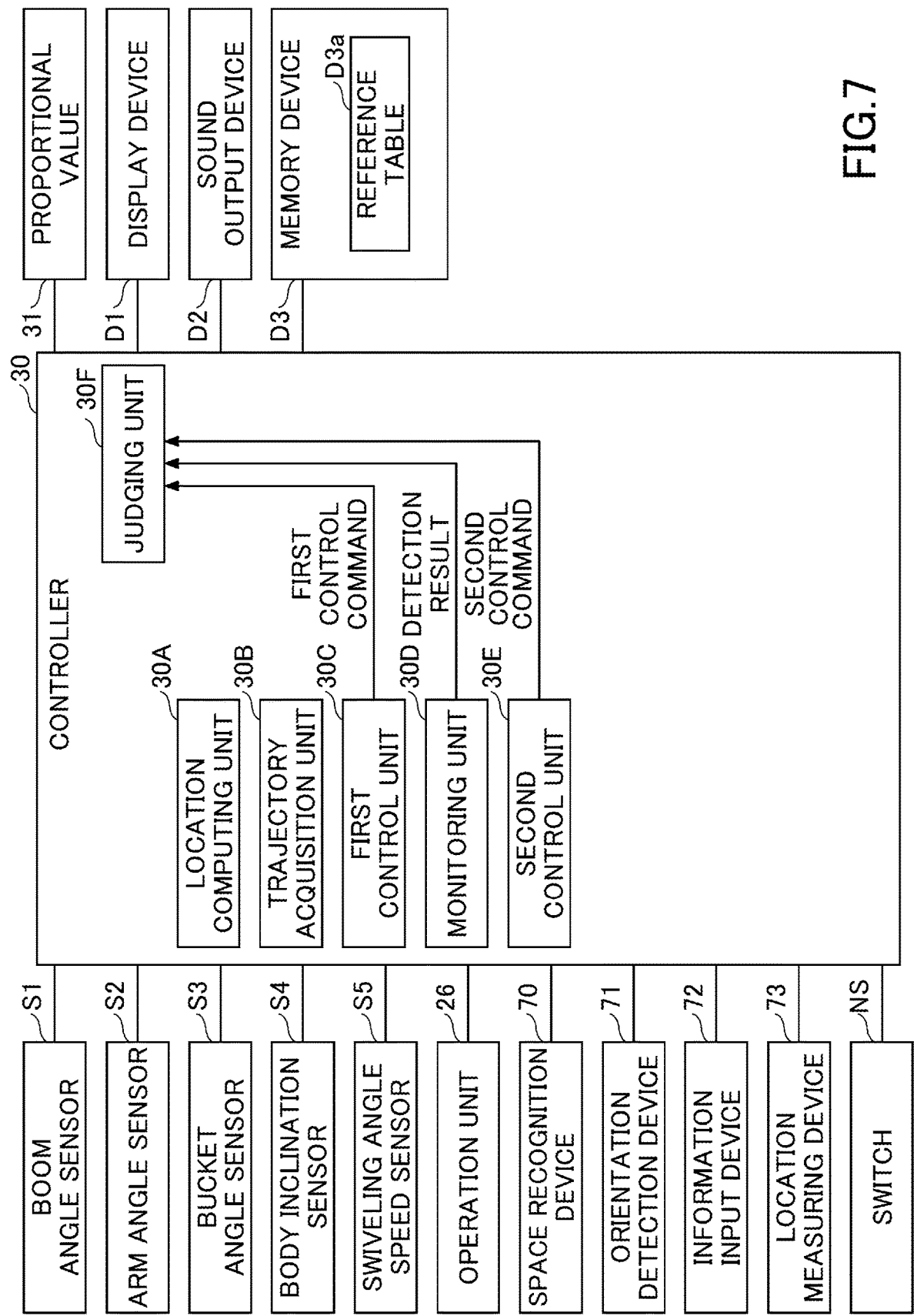
FIG. 7 is a view illustrating another example of the configuration of the controller.

Next, another configuration example of the controller 30 will be described with reference to FIG. 7. FIG. 7 illustrates another configuration example of the controller 30. The controller 30 illustrated in FIG. 7 differs from the controller 30 illustrated in FIG. 5 in that the controller 30 illustrated in FIG. 7 selects the priority control unit based on the predetermined priority order for each object comes in contact with the shovel 100, but is the same as the controller 30 illustrated in FIG. 5 in other respects. Therefore, the description of common parts are omitted and different parts are described in detail.

In FIG. 7, as in the case of FIGS. 6A to 6C, the controller 30 is configured to select one control unit as the priority control unit when the conflict occurs among a plurality of control units. In FIG. 7, the plurality of control units includes the first control unit 30C for causing the attachment actuator to act autonomously such that the target work surface coincides with the predetermined part of the excavation attachment, and a second control unit 30E for causing the attachment actuator to autonomously operate or stop such that the excavation attachment does not contact with the surrounding object, as in FIGS. 6A-6C.

Specifically, as illustrated in FIGS. 6A and 6B, until the conflict occurs between the first control unit 30C and the second control unit 30E, the controller 30 causes the front edge of the bucket 6 to move along the slope surface by the first control unit 30C.

Thereafter, the monitoring unit 30D of the controller 30 detects the object EC based on the output of an upper sensor for recognizing the object present in a space above the upper-part swiveling body 3, for example, and judges that there is a risk that the back face of the boom 4 may be in contact with the object EC. The object EC is, for example, a branch of a tree existing directly above the boom 4.

In this case, the judging unit 30F of the controller 30 receives the first control command from the first control unit 30C and the second control command from the second control unit 30E, and judges whether the conflict is occurring between the first control command and the second control command. At this time, the first control command includes the control command for extending the boom cylinder 7, and the second control command includes the control command to stop the boom cylinder 7. Therefore, the judging unit 30F judges that there is the conflict between the first control command and the second control command.

The judging unit 30F selects the priority control unit based on the detection result of the monitoring unit 30D and the reference table D3a previously stored in the memory device D3. The reference table D3a is, for example, a database table systematically configured so that the controller 30 can search the degree of protection of a freely-selected object. The degree of protection is, for example, the degree of protection against contact, and the higher the degree of protection, the higher the priority of protection against contact with the shovel 100. In the example illustrated in FIG. 7, the degree of protection of "people" is set to be the highest. The degree of protection of "slope surface" is set higher than that of "tree", and the degree of protection of "electric wire" is set higher than that of "slope surface". The reference table D3*a* may be configured so that the operator can change the degree of protection of each object through the information input device 72 or the like, or may be configured so that the degree of protection of each object cannot be changed.

For example, when it is determined that the object EC is a tree based on the output of the upper sensor, the monitoring unit 30D outputs the detection of the tree to the judging unit 30F.

Referring to the reference table D3*a*, the judging unit 30F compares the degree of protection of "tree" that may come into contact with the back face of the boom 4 with the degree of protection of "slope surface" that is the object of finishing work. In the example illustrated in FIG. 7, the degree of protection of "slope surface" is higher than the degree of protection of "tree". Therefore, the judging unit 30F selects, as the priority control unit, the first control unit 30C for controlling the front edge of the bucket 6 not to excavate the slope surface as the target work surface.

Therefore, the judging unit 30F outputs the final control command including a control command for extending the boom cylinder 7 and the control command for extending the arm cylinder 8 to the proportional valve 31.

As a result, the back face of the boom 4 contacts the object EC (tree), while the front edge of the bucket 6 move along the slope surface as illustrated in FIG. 6A. This control enables the operator to continue the slope finishing work until the front edge of the bucket 6 reaches the shoulder of the shoulder. Thus, the slope surface can be formed in conformity with the target work surface.

Alternatively, when it is determined that the object EC is the electric wire based on the output of the upper sensor, the monitoring unit 30D outputs the detection of the wire to the judging unit 30F.

Referring to the reference table D3*a*, the judging unit 30F compares the degree of protection of "electric wire" that may come into contact with the back face of the boom 4 with the degree of protection of "slope surface" that is the object of finishing work. In the example illustrated in FIG. 7, the degree of protection of "wire" is higher than that of "slope surface". Therefore, the judging unit 30F selects the second control unit 30E for controlling the back face of the boom 4 so as not to contact the electric wire as the priority control unit.

Therefore, the judging unit 30F outputs the final control command including the control command to stop the boom cylinder 7 to the proportional valve 31. In the example illustrated in FIG. 7, as in the case of FIGS. 6A and 6B, the judging unit 30F is configured to include the control command regarding the arm cylinder 8 included in the first control command output by the first control unit 30C, which is not selected as the priority control unit, in the final control command. This is because there is no conflict in the control command for the arm cylinder 8.

As a result, the front edge of the bucket excavates the slope beyond the target work surface as illustrated in FIG. 6B, but the back face of the boom 4 does not contact the object EC (electric wire). With this control, the operator can prevent the back of the boom 4 from contacting the object EC (wire).

However, the judging unit 30F may be configured such that the control command regarding the arm cylinder 8 included in the first control command output by the first control unit 30C that is not selected as the priority control unit is not included in the final control command. In this case, the judging unit 30F may be configured to stop the arm cylinder 8.

Figure 8:
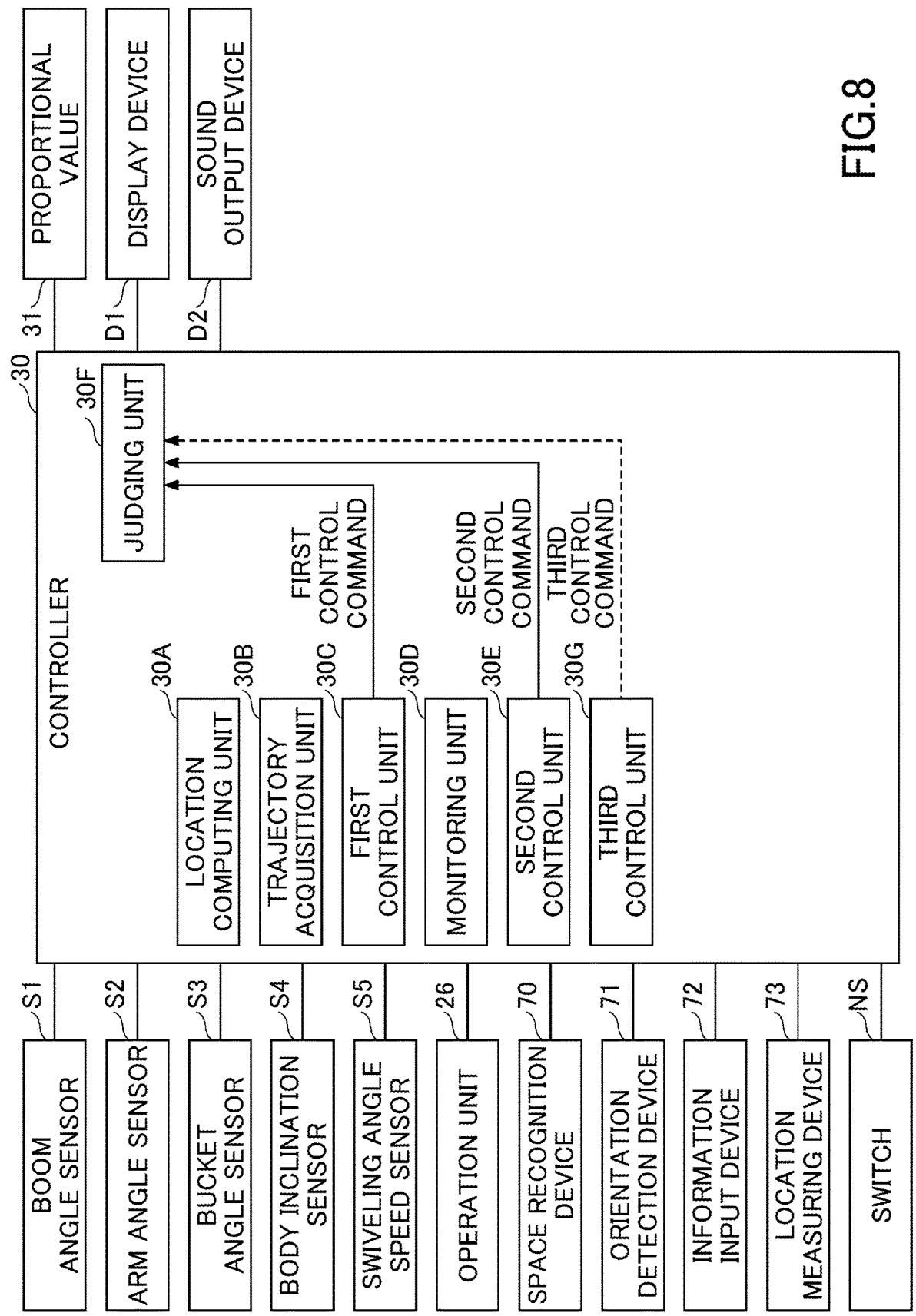
FIG. 8 is a view illustrating further another example of the configuration of the controller.

Referring now to FIG. 8, another configuration example of the controller 30 will be described. FIG. 7 is a diagram illustrating yet another configuration example of the controller 30. The controller 30 illustrated in FIG. 8 differs from the controller 30 illustrated in FIG. 5 in that a third control unit 30G, which is different from the first control unit 30C and the second control unit 30E, can be selected as the priority control unit, but is the same as the controller 30 illustrated in FIG. 5 in other respects. Therefore, the description of the common parts is omitted and the different parts are described in detail.

In FIG. 8, the controller 30 is configured to select one control unit as the priority control unit when in a case where the conflict occurs among the plurality of control units as in the case of FIGS. 6A to 6C. In FIG. 8, the plurality of control units includes the first control unit 30C for causing the attachment actuator to act autonomously such that a target work surface coincides with a predetermined part of the excavation attachment, and a second control unit 30E for causing the attachment actuator to act autonomously or stop such that the excavation attachment does not contact the surrounding object as in FIGS. 6A-6C. Moreover, the controller 30 illustrated in FIG. 8 includes the third control unit 30G.

The third control unit 30G is configured to be capable of implementing a third control process of autonomously operating the shovel 100, independent of the first control unit 30C and the second control unit 30E. In the example illustrated in FIG. 8, in a case where it is determined that the first control unit 30C and the second control unit 30E compete, the judging unit 30F is configured to restrict the movement of the attachment or stop the attachment. For example, when a complex action is performed by moving a plurality of hydraulic actuators, by limiting all movements of the plurality of hydraulic actuators, the contact between the object EC detected by the monitoring unit 30D and the back face of the boom 4 is prevented, and the front edge of the bucket 6 is prevented from excavating the slope surface beyond the target work surface.

In a case where it is determined that the contact between the excavation attachment and the object cannot be avoided even when the attachment is stopped, the third control unit 30G may cause the actuator to act autonomously independent of the contents of the operator's operation of the operation device 26 in order to avoid contact.

In addition, even if the actuator is caused to act autonomously, in a case where it is determined that the contact between the excavation attachment and any of a plurality of objects cannot be avoided, the third control unit 30G may determine the content of autonomous action of the actuator based on the degree of protection of each object after identifying the type of each object. In this case, for example, the third control unit 30G may obtain the degree of protection of each object by referring to the reference table D3*a* described in FIG. 7. With this configuration, if any one from among the plurality of objects cannot be avoided in contact with the shovel 100, the controller 30 causes the shovel 100 to be in contact with the object that causes a relatively weak influence by the contact to thereby prevent the contact between the object that causes a relatively strong influence by the contact with the shovel 100.

The third control unit 30G may cause not only the attachment actuator but also at least one from among the hydraulic swivel motor 2A and the hydraulic travel motor 2M to act autonomously.

In the example illustrated in FIG. 8, the third control unit 30G is configured to output the third control command to the judging unit 30F in a case where the judging unit 30F judges that the conflict is occurring. The dashed arrow in FIG. indicates that the third control unit 30G does not output the third control command until the conflict occurs between the first control command and the second control command. However, the third control unit 30G may be configured to output the third control command to the judging unit 30F before the judging unit 30F judges that there is the conflict.

Specifically, as illustrated in FIGS. 6A and 6B, until the conflict occurs between the first control unit 30C and the second control unit 30E, the controller 30 moves the front edge of the bucket 6 along the slope surface by the first control unit 30C.

Thereafter, the monitoring unit 30D of the controller 30 detects the object EC based on the output of the upper sensor for recognizing the object present in the space above the upper-part swiveling body 3, for example, and determines the risk that the back face of the boom 4 may become in contact with the object EC. The object EC is, for example, a branch of the tree existing directly above the boom 4.

In this case, the judging unit 30F of the controller 30 receives the first control command from the first control unit 30C and the second control command from the second control unit 30E, and judges whether the first control command and the second control command conflict. At this time, the first control command includes the control command for extending the boom cylinder 7, and the second control command includes the control command for stopping the boom cylinder 7. Therefore, the judging unit 30F judges that there occurs the conflict between the first control command and the second control command.

At this time, the judging unit 30F selects the third control unit 30G as the priority control unit and outputs the third control command outputted by the third control unit 30G as the final control command to the proportional valve 31.

Figure 9:
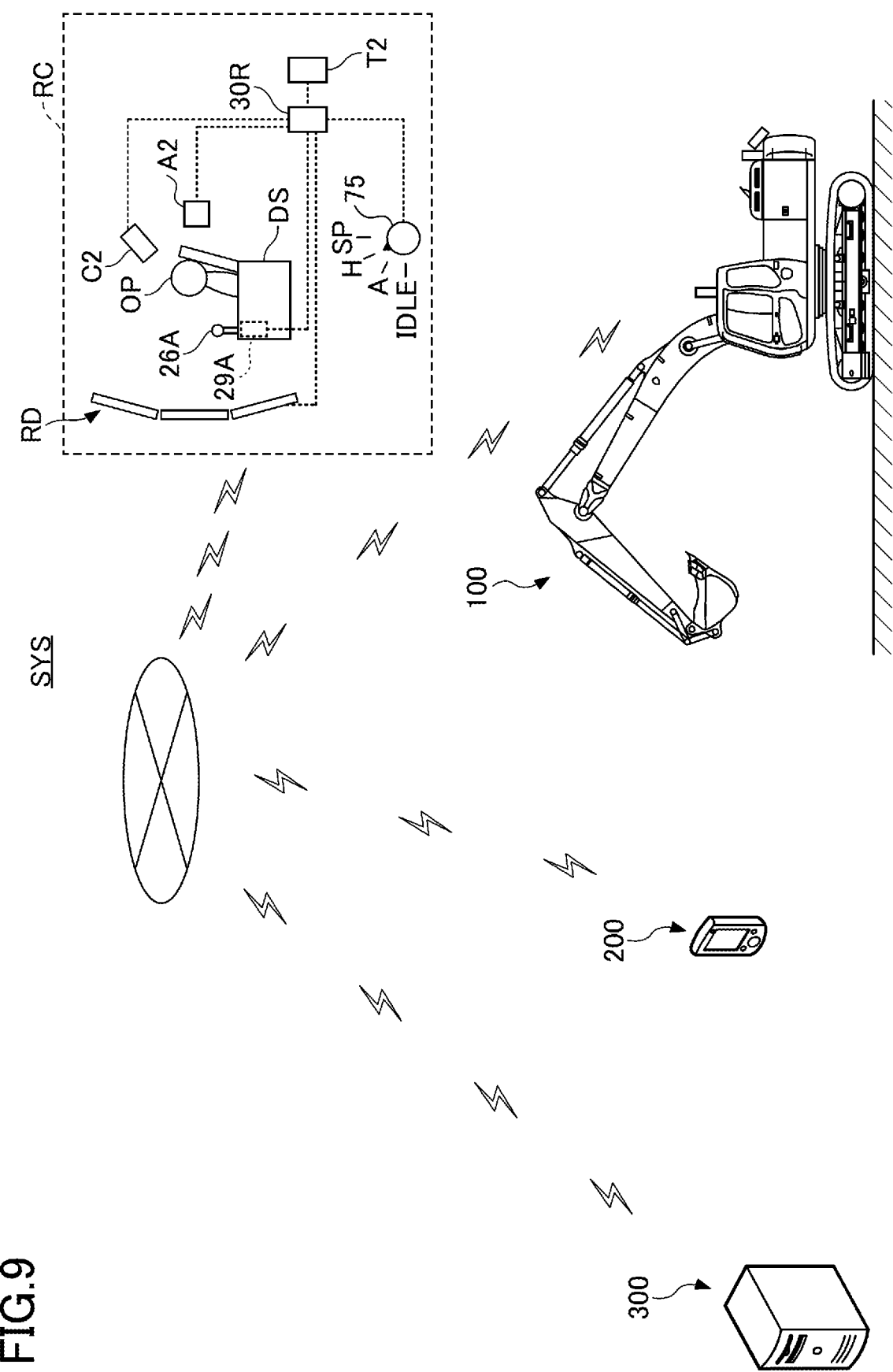
FIG. 9 is a schematic diagram illustrating an example of a work system.
Figure 10:
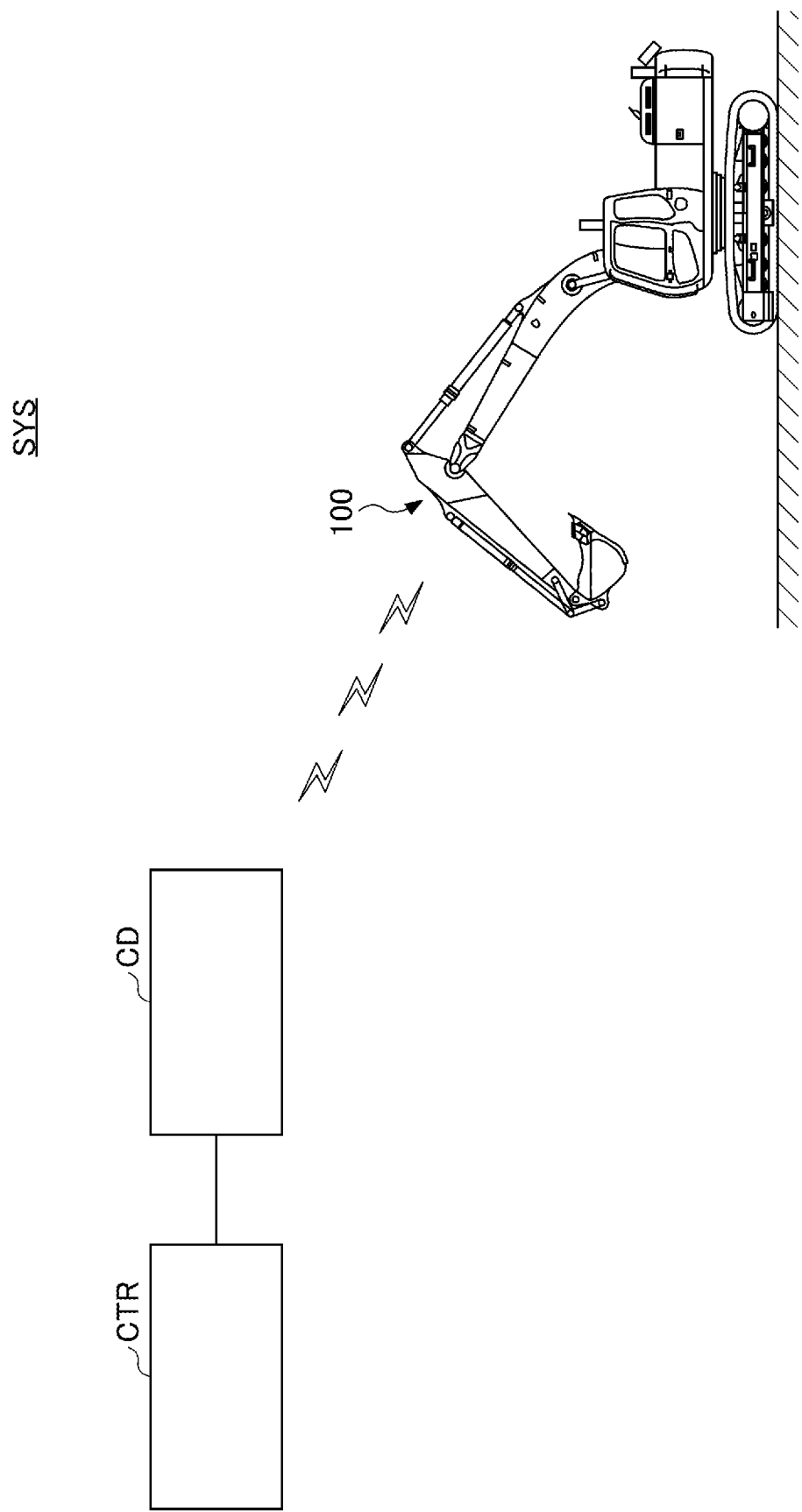
FIG. 10 is a schematic diagram illustrating another example of a work system.

As a result, the front edge of the bucket 6 are stopped so as not to excavate the slope surface beyond the target work surface, and the back face of the boom 4 is stopped so as not to contact the object EC. Next, a work system SYS will be described with reference to FIG. 9. FIG. 9 is a schematic diagram illustrating an example of the work system SYS. As illustrated in FIG. 9, the work system SYS includes a shovel 100, a support device 200, and an administration device 300. The work system SYS is configured to support work by one or more shovels 100. The information obtained by the shovel 100 may be shared with the administrator and the operators of the other shovels in the work system SYS. The numbers of the shovels 100, support devices 200, and administration device 300 included in the work system SYS may be one or more. In this example, the work system SYS includes one shovel 100, one support device 200, and one administration device 300. The support device 200 is typically a portable terminal device, such as a laptop computer terminal, a tablet terminal, or a smartphone carried by a worker or the like at a work site. The support device 200 may be a portable terminal carried by the operator of the shovel 100. The support device 200 may be a fixed terminal device. The administration device 300 is typically a fixed terminal device, for example, a server computer (so-called cloud server) installed in an administration center or the like outside the work site. The administration device 300 may be, for example, an edge server configured at a work site. The administration device 300 may also be a portable terminal device (e.g., a laptop computer terminal, a tablet terminal, or a portable terminal such as a smartphone). At least one from among the support device 200 and the administration device 300 may include the monitor and the operation device for the remote operation. In this case, the operator using the support device 200 or the administrator using the administration device 300 may operate the shovel 100 using the operation device for the remote operation. The operation device for the remote operation is communicatively connected to the controller 30 mounted to the shovel 100 via, for example, a wireless communication network, such as the near field wireless communication network, portable telephone communication network, or satellite communication network. The various information pieces displayed on the display device D1 installed inside the cabin 10 (for example, image information representing the surrounding state of the shovel 100 or various setting screens) may be displayed on a display device connected to at least one from among the support device 200 and the administration device 300. The image information indicating the surrounding state of the shovel 100 may be generated based on an image captured by the image capturing device (e.g., a camera as the space recognition device 70). Accordingly, the worker who uses the support device 200 or the administrator who uses the administration device 300 may remotely operate the shovel 100 or make various settings related to the shovel 100 while checking the surrounding states of the shovel 100. For example, in the work system SYS, the controller 30 of the shovel 100 may transmit the information related to at least one from among the time and location when the switch NS is depressed, the target trajectory used for the shovel 100 to act autonomously, and the trajectory actually traced by the predetermined part during the autonomous action to at least one from among the support device 200 and the administration device 300. The controller 30 may then transmit the imaging image of the image capturing device to at least one of the support device 200 and the administration device 300. The captured image may be a plurality of images captured during the autonomous operation. Additionally, the controller 30 may transmit information related to at least one from among the support device 200 and the administration device 300, such as data about the action of the shovel 100 during the autonomous operation, data related to the attitude of the shovel 100, and data related to the attitude of the excavation attachment. Thus, a worker using the support device 200 or the administrator using the administration device 300 can obtain information about the shovel 100 during the autonomous operation. In this manner, in the support device 200 or the administration device 300, the type and position of the object to be monitored outside the monitoring range of the shovel 100 are stored in the memory unit in time series. Here, in the support device 200 or the administration device 300, the object (information) stored exists in the outside of the monitoring range of the shovel 100 and may be the type and position of the object to be monitored within the monitoring range of another shovel. Thus, the work system SYS enables the operator of the shovel 100 to share the information related to the shovel 100 with the administrator and another operator of another shovel. As illustrated in FIG. 9, the communication device installed in the shovel 100 may be configured to transmit the information to and receive the information from the communication device T2 installed in a remote operation room RC using wireless communications. In the example illustrated in FIG. 9, the communication device installed in the shovel 100 and the communication device T2 are configured to transmit and receive information through a 5G mobile communication line (5G line), an LTE line, or a satellite line. The remote-control room RC includes the remote-controller 30R, the sound output device A2, the indoor image capturing device C2, the display device RD, and the communication device T2, and so on. Further, in the remote-control room RC, the driver's seat DS where the operator OP who remotely controls the shovel 100 sits is installed. The remote-controller 30R is an arithmetic device that performs various calculations. In this embodiment, the remote-controller 30R is made of a microcomputer including a CPU and a memory like the controller 30. The various functions of the remote-controller 30R are realized when the CPU executes a program stored in the memory. The sound output device A2 is configured to output sound. In this embodiment, the sound output device A2 is a speaker and is configured to play back the sound collected by the sound collecting device (not shown) installed in the shovel 100. The indoor image capturing device C2 is configured to capture the image of the inside of the remote-control room RC. In this embodiment, the indoor image capturing device C2 is a camera installed inside the remote operation room RC and is configured to capture the image of an operator OP seated in the driver's seat DS. The communication device T2 is configured to control wireless communication with the communication device mounted to the shovel 100. In this embodiment, the driver's seat DS functions similar to that of the operator's seat, which is located in the cabin 10 of a typical shovel. Specifically, a left console box is provided on the left side of the driver's seat DS, and a right console box is provided on the right side of the driver's seat DS. The left operation lever is provided at the front edge of the upper surface of the left console box, and the right operation lever is provided at the front edge of the upper surface of the right console box. The travel lever and the travel pedal are disposed in front of the driver's seat DS. In addition, a dial 75 is disposed at the center of the upper surface of the right console box. The left control lever, the right control lever, the travel lever, and the travel pedal are included in the operation device 26A. The dial 75 is a dial for adjusting the number of revolutions of the engine 11, and is configured so that, for example, the number of engine revolutions can be switched in four stages. Specifically, the dial 75 is configured to be capable of switching engine RPM in four stages: SP mode; H mode; A mode; and idling mode. The dial 75 transmits data related to setting of the engine revolution speed to the controller 30. The SP mode is a revolution speed mode selected when the operator OP wishes to prioritize the workload, using the highest engine revolution speed. The H mode is the evolution speed mode selected by the operator OP to optimize both the workload and fuel consumption, and utilizes the second highest engine revolution speed. The A mode is the revolution speed mode selected by the operator OP to operate the shovel with low noise while giving priority to the fuel consumption, and uses the third highest engine revolution speed. The idling mode is the engine revolution speed mode selected when the operator OP wishes to maintain idling of the engine, and utilizes the lowest engine revolution speed. The engine 11 is constantly controlled by the selected engine revolution speed in the speed mode through the dial 75. The operation sensor 29A is provided in the operation device 26A for detecting the operation contents of the operation device 26A. Operation sensor 29A may be, for example, an inclination sensor that detects the inclination angle of the operation lever or an angle sensor that detects the oscillation angle about the oscillation axis of the operation lever. The operation sensor 29A may be configured by other sensors such as a pressure sensor, a current sensor, a voltage sensor, a distance sensor, and/or the like. The operation sensor 29A outputs information related to the detected operation contents of the operation device 26A to the remote-controller 30R. The remote-controller 30R generates an operation signal based on the received information and transmits the generated operation signal to the shovel 100. The operation sensor 29A may be configured to generate the operation signal. In this case, the operation sensor 29A may output an operation signal to the communication device T2 without going through the remote-controller 30R. The display device RD is configured to display information related to the surrounding area of the shovel 100. In this embodiment, the display device RD is a multi-display composed of nine monitors in three columns (three columns long and three columns wide) and is configured to display the front, left, and right spaces of the shovel 100. Each monitor is a liquid crystal monitor or an organic EL monitor. However, the display device RD may comprise one or more curved monitors or may comprise a projector. The display device RD may also be configured to display the front, left, right, and rear spaces of the shovel 100. The display device RD may be a display device wearable by an operator OP. For example, the display device RD is a head mount display and may be configured to transmit to and receive information from the remote-controller 30R by wireless communication. The head mount display may be wired to the remote-controller 30R. The head mount display may be a transmissive head mount display or a non-transmissive head mount display. The head mount display may be a single-eye head mount display or a double-eye head mount display. The display device RD is configured to display an image that enable the operator OP present in the remote-control room RC to view the surrounding area of the shovel 100. That is, the display device RD displays the image so that the operator, while in the remote-control room RC, can check the state of the surrounding area of the shovel 100 regardless whether the operator is present in the cabin 10 of the shovel 100 or not. Next, another configuration example of the work system SYS will be described with reference to FIG. 10. In the example illustrated in FIG. 10, the work system SYS is configured to support the work by the shovel 100. Specifically, the work system SYS includes a communication device CD for communicating with the shovel 100 and a control device CTR. The control device CTR is configured to include a first control unit that causes the actuator of the shovel 100 to act autonomously and a second control unit that causes the actuator to act autonomously. The control device CTR is configured to select, as the priority control unit that preferentially acts, one control unit from among the plurality of control units including the first control unit and the second control unit in a case where it is determined that the conflict is occurring among the plurality of control units that includes the first control unit and the second control unit. The first control unit and the second control unit are represented separately for the sake of convenience of description, but need not be physically distinguished. The first control unit and the second control unit may be configured by software components or hardware components that are common in whole or in part.

As described above, the shovel 100 according to the embodiment of the present invention includes a lower-part traveling body 1, an upper-part swiveling body 3 mounted to the lower-part traveling body 1 so as to be capable of swiveling, an actuator, and a controller 30 as a control device including a first control unit 30C for causing the actuator to act autonomously and a second control unit 30E for causing the actuator to act autonomously. When it is judged that the conflict is occurring among a plurality of control units including the first control unit 30C and the second control unit 30E, the controller 30 is configured to select, as the priority control unit for preferentially causing one of the plurality of control units that includes the first control unit 30C and the second control unit 30E to act autonomously. This configuration provides the shovel 100 that acts properly even when multiple functions compete.

For example, in a case where the conflict is occurring between the first control unit 30C and the second control unit 30E, the controller 30 may be configured to select one of the plurality of control units including the first control unit 30C and the second control unit 30E, as the priority control unit, based on a priority order previously set for each control unit.

Alternatively, in a case where the conflict is occurring between the first control unit 30C and the second control unit 30E, the controller 30 may be configured to select one of the plurality of control units including the first control unit 30C and the second control unit 30E, as the priority control unit, based on a predetermined priority order for each object comes in contact with the shovel 100. In this case, the priority may be based on, for example, the degree of protection of each object.

Alternatively, in a case where the conflict is occurring between the first control unit 30C and the second control unit 30E, the controller 30 may be configured to select the third control unit 30G, which is different from the first control unit 30C and the second control unit 30E, as the priority control unit.

With these configurations, the controller 30 can cause the shovel 100 to act properly even when multiple functions compete.

The preferred embodiment of the present invention has been described in detail above. However, the invention is not limited to the embodiments described above. Various modifications, substitutions and the like may be applied to the embodiments described above without departing from the scope of the invention. Also, the features described separately may be combined unless there is a technical inconsistency.

For example, in the above described embodiment, the first control unit 30C is configured to enable the shovel 100 to act autonomously when supporting the finishing work of the descent slope surface. However, the first control unit 30C may be configured to enable the shovel 100 to act autonomously to support in finishing the upward slope surface, or it may be configured to enable the shovel 100 to act autonomously to support in an operation of pulling horizontally.

DESCRIPTION OF SYMBOLS

1: lower-part traveling body
10: crawler
1CL: left crawler
1CR: right crawler
2: swivel mechanism
2A: hydraulic swivel motor
2M: hydraulic travel motor
2ML: left hydraulic travel motor
2MR: right hydraulic travel motor
3: upper-part swiveling body
4: boom
5: arm
6: bucket
7: boom cylinder
8: arm cylinder
9: bucket cylinder
10: cabin
11: engine
13: regulator
14: main pump
15: pilot pump
17: control valve
18: inverter
19: capacitor
26, 26A: operation device
26D: travel lever
26DL: left travel lever
26DR: right travel lever
26L: left operation lever
26R: right operation lever
28: discharge pressure sensor
29, 29DL, 29DR, 29LA, 29LB, 29RA, 29RB: pressure sensor
29A: operation sensor
30: controller
30A: location computing unit
30B: trajectory acquisition unit
30C: first control unit
30D: monitoring unit
30E: second control unit
30F: judging unit
30G: third control unit
30R: remote-controller
31, 31AL-31DL, 31AR-31DR: proportional value
32, 32AL-32DL, 32AR-32DR: shuttle valve
33, 33AL-33DL, 33AR-33DR: proportional value
40: center bypass pipe route
42: parallel pipe route
70: space recognition device
70F: forward sensor
70B: backward sensor
70L: leftward sensor
70R: rightward sensor
71: orientation detection device
72: information input device
73: location measuring device
75: dial
100: shovel
171-176: control valve
200: support device
300: administration device
A2: sound output device
AT: excavation attachment
C2: room
CD: communication device
CTR: control device
D1: display device
D2: sound output device
D3: memory device
D3a: reference table
D5: driver's seat
NS: switch
OP: operator
RC: remote-control room
RD: display device
S1: boom angle sensor S2: arm angle sensor
S3: bucket angle sensor
S4: body inclination sensor
S5: swiveling angle speed sensor
SYS: work system
T2: communication device

What is claimed is:

1. A shovel comprising:
a lower-part traveling body;
an upper-part swiveling body swivelably mounted to the lower-part traveling body;
an actuator; and
a hardware processor configured to implement a first control process to cause the actuator to act autonomously, and a second control process to cause the actuator to act autonomously,
wherein the hardware processor is configured to
determine whether there is a conflict between the first control process and the second control process in response to receiving, during implementation of the first control process, a control command to implement the second control process, and
implement one control process among a plurality of control processes including the first control process and the second control process without implementing the rest of the plurality of control processes, in response to determining that there is the conflict between the first control process and the second control process,
the hardware processor is configured to select the one control process from among the plurality of control processes as a control process to be preferentially implemented over the rest of the plurality of control processes, based on a priority order preset for a plurality of objects each having a possibility of coming in contact with the shovel, in response to determining that there is the conflict between the first control process and the second control process, and
the priority order is a priority order of protection, the plurality of objects include a person, and the person is given a highest degree of protection among the plurality of objects.

2. The shovel according to claim 1,
wherein the hardware processor is configured to select a third control process that is different from both of the first control process and the second control process as the control process to be preferentially implemented over the rest of the plurality of control processes, in response to determining that there is the conflict between the first control process and the second control process.

3. The shovel according to claim 1, wherein the hardware processor is configured to
detect an object in an area surrounding the shovel, the object having a possibility of contacting the shovel,
implement the first control process to cause the actuator to act autonomously to assist an operator in manually operating the shovel while the operator is manually operating the shovel, and
implement the second control process to cause the actuator to act autonomously, independent of the first control process, to move or stop the shovel to avoid contact with the detected object.

4. The shovel according to claim 1, wherein the hardware processor is configured to implement the selected one control process to cause the actuator to act autonomously to operate the shovel, and in response to determining that it is unavoidable for the shovel to contact at least two of the plurality of objects while implementing the selected one control process, cause the actuator to act autonomously to cause the shovel to contact one of the at least two of the plurality of objects based on the priority order of protection preset for the plurality of objects, the one of the at least two of the plurality of objects having a lower degree of protection than the rest of the at least two of the plurality of objects.

5. A work system that supports a work by a shovel, the shovel including a lower-part traveling body, an upper-part swiveling body swivelably mounted to the lower-part traveling body, an attachment mounted to the upper-part swiveling body and including an end attachment, and an actuator, the work system comprising:
a communication device configured to communicate with the shovel; and
a hardware processor configured to implement a first control process to cause the actuator to act autonomously and a second control process to cause the actuator to act autonomously,
wherein the hardware processor is configured to
determine whether there is a conflict between the first control process and the second control process in response to receiving, during implementation of the first control process, a control command to implement the second control process, and
implement one control process among a plurality of control processes including the first control process and the second control process without implementing the rest of the plurality of control processes, in response to determining that there is the conflict between the first control process and the second control process,
the hardware processor is configured to select the one control process from among the plurality of control processes as a control process to be preferentially implemented over the rest of the plurality of control processes, based on a priority order preset for a plurality of objects each having a possibility of coming in contact with the shovel, in response to determining that there is the conflict between the first control process and the second control process, and
the priority order is a priority order of protection, the plurality of objects include a person, and the person is given a highest degree of protection among the plurality of objects.

6. The work system according to claim 5,
wherein the hardware processor is configured to select a third control process that is different from both of the first control process and the second control process as the control process to be preferentially implemented over the rest of the plurality of control processes, in response to determining that there is the conflict between the first control process and the second control process.

7. The work system according to claim 5, wherein the hardware processor is configured to
detect an object in an area surrounding the shovel, the object having a possibility of contacting the shovel,
implement the first control process to cause the actuator to act autonomously to assist an operator in manually operating the shovel while the operator is manually operating the shovel, and
implement the second control process to cause the actuator to act autonomously, independent of the first control process, to move or stop the shovel to avoid contact with the detected object.

8. The work system according to claim 5, wherein the hardware processor is configured to implement the selected one control process to cause the actuator to act autonomously to operate the shovel, and in response to determining that it is unavoidable for the shovel to contact at least two of the plurality of objects while implementing the selected one control process, cause the actuator to act autonomously to cause the shovel to contact one of the at least two of the plurality of objects based on the priority order of protection preset for the plurality of objects, the one of the at least two of the plurality of objects having a lower degree of protection than the rest of the at least two of the plurality of objects.

* * * * *